(12) United States Patent
Fischer et al.

(10) Patent No.: US 11,078,343 B2
(45) Date of Patent: Aug. 3, 2021

(54) ABSORBENT POLYMERIC FOAM FOR SHOE INSOLES

(71) Applicant: EVONIK OPERATIONS GMBH, Essen (DE)

(72) Inventors: Steffen Fischer, Krefeld (DE); Diedrich Schmidt, Greensboro, NC (US); Scott Smith, Düsseldorf (DE); Xinyuan Yang, Greensboro, NC (US)

(73) Assignee: Evonik Operations GmbH, Essen (DE)

( * ) Notice: Subject to any disclaimer, the term of this patent is extended or adjusted under 35 U.S.C. 154(b) by 282 days.

(21) Appl. No.: 15/727,245

(22) Filed: Oct. 6, 2017

(65) Prior Publication Data

US 2019/0106551 A1 Apr. 11, 2019

(51) Int. Cl.
| | |
|---|---|
| *C08F 2/56* | (2006.01) |
| *C08F 2/44* | (2006.01) |
| *C08J 9/228* | (2006.01) |
| *C08J 9/12* | (2006.01) |
| *A43B 17/00* | (2006.01) |
| *C08J 9/20* | (2006.01) |
| *C08J 9/08* | (2006.01) |

(52) U.S. Cl.
CPC ............. *C08J 9/228* (2013.01); *A43B 17/003* (2013.01); *C08F 2/44* (2013.01); *C08F 2/56* (2013.01); *C08J 9/08* (2013.01); *C08J 9/12* (2013.01); *C08J 9/122* (2013.01); *C08J 9/20* (2013.01); *C08J 2203/02* (2013.01); *C08J 2203/06* (2013.01); *C08J 2207/00* (2013.01); *C08J 2333/02* (2013.01)

(58) Field of Classification Search
CPC .......... C08F 2/44; C08F 2/56; A43B 1/00–14; B29C 44/5627
See application file for complete search history.

(56) References Cited

U.S. PATENT DOCUMENTS

| | | | |
|---|---|---|---|
| 4,808,469 | A | 2/1989 | Hiles |
| 5,859,077 | A | 1/1999 | Reichman |

(Continued)

FOREIGN PATENT DOCUMENTS

| | | |
|---|---|---|
| CN | 106366232 A | 2/2017 |
| CN | 104558322 B | 4/2017 |

(Continued)

OTHER PUBLICATIONS

Machine Translation of CN 104177745 by Chen et al. (Year: 2014).*

(Continued)

*Primary Examiner* — Michael M Dollinger
*Assistant Examiner* — Christina H. W. Rosebach
(74) *Attorney, Agent, or Firm* — Linda S. Li; Jason S. Ngui

(57) ABSTRACT

The present invention relates to a polymeric foam, and a process for making the polymeric foam comprising the steps of a) providing a monomeric solution consisting of a polymerizable, ethylenically unsaturated monomer containing one or more acid groups, water and one or more crosslinkers having more than one polymerizable group per molecule; b) introducing a blowing agent to the monomer solution; c) treating the monomer solution with an ultrasonic treatment; d) introducing one or more initiation agents to the monomer solution; and e) polymerizing the monomer solution.

7 Claims, 7 Drawing Sheets

(56) References Cited

U.S. PATENT DOCUMENTS

| | | |
|---|---|---|
| 5,994,440 A | 11/1999 | Staples et al. |
| 6,090,875 A | 7/2000 | Staples et al. |
| 2009/0234039 A1 | 9/2009 | Schutte et al. |
| 2011/0078920 A1 | 4/2011 | Tschernjaew |
| 2015/0283284 A1 | 10/2015 | Azad et al. |
| 2016/0015128 A1 | 1/2016 | Cazarez |
| 2016/0073730 A1 | 3/2016 | Martinez |

FOREIGN PATENT DOCUMENTS

| | | | |
|---|---|---|---|
| EP | 0356242 A2 * | 2/1990 | ........ C08F 2/10 |
| EP | 0827753 A2 | 3/1998 | |
| EP | 0876888 A1 | 11/1998 | |
| EP | 2518092 A1 | 10/2012 | |
| EP | 2589613 A1 | 5/2013 | |
| JP | H11140213 A | 5/1999 | |
| WO | 2007135069 A1 | 11/2007 | |

OTHER PUBLICATIONS

"Ultrasonic Dissolving of Solids in Liquids" by Hielscher. Accessed via WayBack Machine to date of Nov. 25, 2013 at https://www.hielscher.com/ultrasonic-dissolving-of-solids-in-liquids.htm (Year: 2013).*

"UP200St—Powerful Ultrasonic Lab Homogenizer" by Hielscher. Available at https://www.hielscher.com/up200st-powerful-ultrasonic-lab-homogenizer.htm (Year: 2019).*

Chapter 3 Ultrasound-assisted sample digestion, Editor(s): Luque de Castro, F. Priego Capote, Techniques and Instrumentation in Analytical Chemistry, Elsevier, vol. 26, 2007, pp. 69-97 (Year: 2007).*

Machine translation of JP 11-140213 by Nagahama et al. (Year: 1999).*

Partial human translation of JP 11-140213 by Nagahama et al. (Year: 1999).*

"Principles of the Processing of Plastics". Brydson, J.. (1999). Plastics Materials (7th Edition). Elsevier. Retrieved from https://app.knovel.com/hotlink/toc/id:kpPME00001/plastics-materials-7th/plastics-materials-7th (Year: 1999).*

Machine translation of description of WO2014025161A1 by Lee et al. (Year: 2014).*

Machine translation of JP 2004-002562 by Shioji. (Year: 2004).*

* cited by examiner

ABSORBENT POLYMERIC FOAM FOR SHOE INSOLES

FIELD OF THE INVENTION

This invention relates to a process of making absorbent polymeric foam, and the resulting polymeric foam products produced therefrom. This polymerization process involves the use of ultrasonic radiation to control the pore size and compressibility of an absorbent foam, which is suitable for shoe insoles and other end products.

BACKGROUND OF THE INVENTION

Foamed polymeric insoles or shoe inserts for shock absorption in shoes are known. For example, U.S. Pat. No. 4,808,469 for Energy Absorbing Polyurethane Composite Article discloses an energy absorbing and damping device of a predetermined configuration in which the composite is a foam element, and at least one visco-element through which energy is absorbed. A "visco-element" is an elastomeric polymer, such as polyurethane compositions, for shock absorption. The polyurethane layer provides the energy absorbency for the insole or insert. One drawback to this composite is that the composite article is hydrophobic. There is no mechanism in this '469 patent for moisture absorption.

A number of insoles or inserts in the art are specifically configured or contoured for fit and comfort. Another example of a typical insole for shock absorption is U.S. Application Publication No. 2016/0073730 for Contoured Support Insole, which discloses a specially shaped insole with indentations formed in areas where pads are secured. This invention is preferably made of polyurethane. The insole of this invention does not rely on a foam layer for shock absorption, but rather the contour of the insole itself. A similar drawback is that the article of this publication is hydrophobic, which leads to the difficulties of moisture removal, causing discomfort and malodorous effects. There is no disclosure on fast moisture removal.

The art also provides for a number of insoles that have absorbent qualities. For example, U.S. Application Publication. No. 2011/0078920 for Sweat-absorbing Shoe Insole Inserts Having Improved Sweat Absorption discloses a method of improving perspiration absorbency in a shoe or boot using particulate amorphous silica as an absorbent in insoles for shoes and/or boots, as well as the shoe insole made of such a method. The shoe insole of this invention contains an absorbent which contains a particulate silica. The amorphous silica particulate of this invention is not incorporated into the insole, but rather adhered to the underside surface of the apparatus itself. This publication has the drawback in that the insole itself is not absorbent and the silica must attract and absorb the moisture. There is no means of shock absorption. The insole is not a polymeric foam. There is also no means of controlling the compressibility or pore size. The absorption of aqueous liquids by silica is also quite limited.

Another example of an insole having absorbent means is U.S. Application Publication No. 2016/0015128 for Disposable Insert for Footwear. This publication discloses a thin shoe insert having a top and bottom surface made of polypropylene spun-bonded nonwoven materials capable of keeping a wearer's foot clean by absorbing sweat, odor and dirt. The shoe insert of this publication has a significant drawback in that even though the insert draws moisture into the nonwoven material, the moisture is trapped therein in open spaces. There is no mechanism to prevent moisture from being released as a result of compression. Accordingly, the shoe insert in this invention is intended to be disposable, and changed every so often. There is no disclosure in this reference for addressing fast moisture removal or shock absorption. Polypropylene is also hydrophobic and not a good absorber of hydrophilic liquids like sweat or other bodily fluids.

In light of the shortcomings in the prior art, there is a need for a shoe insole or insert that is a polymeric foam capable of rapidly absorbing and retaining moisture, despite being compressible at a reasonable pressure from walking and running, and a manufacturing process for such a product where the pore size and compressibility of the polymeric foam can easily and efficiently be adjusted.

The use of ultrasonic treatment to activate a polymerization process is known. For example, CN 104558322A discloses a polymer synthesis, and particularly relates to a preparation method for activating a polymerization monomer and an initiator by an ultrasonic treatment technology to prepare instant ultrahigh-intrinsic viscosity anionic polyacrylamide dry powder.

However, using ultrasound for polymerization activation is impractical and energy intensive. Disadvantages of the process disclosed in CN 104558322A become readily apparent in which the ultrasonic activation treatment is performed at high intensities and a time duration of 5 min to 30 min. Such a use of ultrasound for activation is impractical in the commercial setting. There is no disclosure in CN 104558322A regarding the use of much lower energy and shorter duration of ultrasonic treatment to control the pore size and compressibility of a polymeric foam. The process produces a product without moisture absorption or shock absorption properties.

U.S. Pat. No. 5,859,077 discloses a method and apparatus for producing an absorbent foam. The method includes forming a reaction solution comprising at least one compound capable of forming an absorbent foam, adding blowing agents under alternating pressures, continuously stiffing the reaction solution, applying mechanical waves to the reaction solution and repeating the stiffing and alternating pressure applications a selected number of times continuously throughout the entire reaction, thereby forming the absorbent foam. This method relies on a particularly complicated apparatus for implementation with repeated alternating pressure steps, and scaling up in a commercial setting using the ultrasonic treatment disclosed in the '077 patent is impracticable. The liquid absorption rates and capacity of the produced foam were also still quite low.

There is a need for a simplified process to make absorbent polymeric foam, where one can control the pore size and compressibility of the polymeric foam, where the resulting product shows excellent shock absorption, while also having the ability to absorb moisture. There is also a need for an improved absorbent polymeric foam suitable for use in shoe insoles or inserts with improved wear comfort, and other applications that could benefit from an improved absorbent foamed polymer. There is also a need for absorbent particles having improved absorption speed where the pore size can be easily controlled. There is also a need for a simpler and more economical process for producing foamed polymeric absorbent materials.

SUMMARY OF THE INVENTION

The present invention is directed to a polymeric foam and a process for making a polymeric foam capable of absorbing aqueous fluids comprising the steps of a) providing a monomeric solution consisting of a polymerizable, ethylenically unsaturated monomer containing one or more acid groups, water and one or more crosslinkers having more than one polymerizable group per molecule; b) introducing a blowing agent to the monomer solution; c) treating the monomer solution with an ultrasonic treatment; d) introducing one or more initiation agents to the monomer solution; and e) polymerizing the monomer solution.

In an embodiment, the absorbent polymeric foam may form into the shape of a foam sheet depending on the shape of the reaction vessel, and the foam sheet can be cut into a shoe insert shape.

In another embodiment, the polymeric foam may be comminuted into particles by cutting and extruding processes.

In an embodiment, the blowing agent is a carbonate or bicarbonate based compound or carbon dioxide.

In an embodiment, the treatment of the monomer solution by ultrasonic treatment is by introducing energy through an ultrasonic probe or an ultrasonic transducer driven surface.

In an embodiment, the monomer solution contains a monomer, a crosslinker and an initiator.

The present invention is also directed to a process for making an absorbent particle comprising the steps of a) providing a monomeric solution consisting of a polymerizable, ethylenically unsaturated monomer containing one or more acid groups, water and one or more crosslinkers having more than one polymerizable group per molecule; b) introducing a blowing agent to the monomer solution; c) treating the monomer solution with an ultrasonic treatment; d) introducing one or more initiation agents to the monomer solution; e) polymerizing the monomer solution; and f) comminuting the polymeric foam (sheet) into particles.

Further, the present invention is directed to a polymeric foam capable of absorbing aqueous fluids prepared by a process comprising the steps of a) providing a monomeric solution consisting of a polymerizable, ethylenically unsaturated monomer containing one or more acid groups, water and one or more crosslinkers having more than one polymerizable group per molecule; b) introducing a blowing agent to the monomer solution; c) treating the monomer solution with an ultrasonic treatment; d) introducing one or more initiation agents to the monomer solution; and e) polymerizing the monomer solution into an absorbent polymeric foam.

Further, the ultrasonic treatment produces one or more of the following changes in the polymeric foam when compared to the process without ultrasonic treatment a) a 10% reduction in average pore diameter; b) a 10% reduction in Young's modulus; c) a 10% reduction in vortex time; and d) a 10% increase in the Free Swell Rate (FSR).

It has been found that the polymeric foam of this invention is applicable for the production of absorbent polymers and a process to make absorbent polymers, sheets, pads or particles.

With the foregoing in mind, it is a feature and advantage of the invention to provide a process of making a foamed polymer by incorporating a blowing agent and using an ultrasonic treatment to control the pore size and compressibility of the resulting polymeric foam. In this invention the polymeric foam is hydrophilic and able to rapidly absorb and hold aqueous fluids. Other features and advantages of the present invention will be evident in the following description.

DEFINITIONS

Within the context of this specification, each term or phrase below will include the following meaning or meanings.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As used herein, the term "about" modifying the quantity of an ingredient in the compositions of the invention or employed in the methods of the invention refers to variation in the numerical quantity that can occur, for example, through typical measuring and liquid handling procedures used for making concentrates or solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial solution. The term "about" includes the given quantity of the ingredient or property as stated. Whether or not modified by the term "about," the claims include equivalents to the quantities.

The terms "polymeric foam", "polymer foam", and "foamed polymer" or variants thereof are employed synonymously in the present disclosure.

The term "Centrifuge Retention Capacity" or "CRC" as used herein refers to the ability of the absorbent polymer or absorbent polymer composition to retain liquid therein after being saturated and subjected to centrifugation as set forth in the Test Procedures disclosed herein.

The term "Absorption Under Load" or "AUL" refers to a test that measures the ability of an absorbent polymer, or absorbent polymer composition to absorb a 0.9 weight percent solution of sodium chloride in distilled water (test solution) while the material is under a defined pressure as set forth in the Test Procedures disclosed herein.

The term "Vortex test" refers to a measurement of absorption speed recorded as the time in seconds that is required for 2 g of an absorbent polymer to close a vortex created by stiffing 50 ml of 0.9 wt % sodium chloride in water at 600 revolution per min on a magnetic stir plate as set forth in the Test Procedures disclosed herein.

The term "Free Swell Rate" or "FSR" refers to a measurement to determine the swell rate in g/g/sec of the water-swellable materials in an aqueous 0.9 wt % sodium chloride in water solution, without stiffing or confining pressure as set forth in the Test Procedures disclosed herein.

The term "Young's modulus" refers to a measurement of the stiffness of a solid material, herein used to describe the compressibility of a material as set forth in the Test Procedures disclosed herein.

The term "monomer solids" refers to the wt % of the monomer solution that is composed of polymerizeable monomers based on the weight of the total monomer solution.

The terms "crosslinked", "crosslink", "crosslinker", or "crosslinking" as used herein refers to any means of linking polymer chains together. Such a crosslinking means can include, for example, physical entanglement, crystalline domains, covalent bonds, ionic complexes and associations, hydrophilic associations such as hydrogen bonding, hydrophobic associations, or Van der Waals forces. Crosslinking, when applied to water soluble polymers generally renders them water-insoluble but water-swellable.

The term "internal crosslinker" or "monomer crosslinker" as used herein refers to the use of a crosslinker in the monomer solution to form the polymer gel structure.

The term "shoe insole" or "shoe insert" refers to a composite or sheet that can be placed inside of a shoe to absorb shock, provide compressibility, absorb moisture, increase the wearer's comfort, or some combination thereof.

The term "dry particulate absorbent polymer" as used herein generally refers to the particulate absorbent polymer having less than about 20 wt % water as defined by the EDANA test method WSP 230.3 (10).

The terms "particle," "particulate," and the like, when used with the term "absorbent polymer," refer to the form of discrete units.

The terms "particulate absorbent polymer" and "particulate absorbent polymer composition" refer to the form of absorbent polymer and absorbent polymer compositions in discrete form, wherein the "particulate absorbent polymer" and "particulate absorbent polymer compositions" may have a particle size of less than 1000 µm, typically from about 150 µm to about 850 µm, with greater than 85% of the particles between 150 µm and 600 µm.

The term "polyacrylic acid (salt)-based absorbent polymer" as used herein refers to a crosslinked absorbent polymer that arbitrarily may contain a graft component and also contains, as a main component, acrylic acid and/or salt thereof (hereinafter, referred to as "acrylic acid (salt)") as a repeating unit. Specifically, "polyacrylic acid (salt)-based water absorbent resin" indicates a polymer that contains preferably 30 mol % to 100 mol % of acrylic acid (salt), based on total moles of monomer used.

The term "polymer" includes, but is not limited to, homopolymers, copolymers, for example, block, graft, random, and alternating copolymers, terpolymers, etc., and blends and modifications thereof. Furthermore, unless otherwise specifically limited, the term "polymer" shall include all possible configurational isomers of the material. These configurations include, but are not limited to isotactic, syndiotactic, and atactic symmetries.

The acronym "PSD" as used herein is an abbreviation for Particle Size Distribution, and referring to the mass distribution of particles remaining on specified sieves as measured through sieve classification according to the standard EDANA test method NWSP 220.0.R2 (15). Moreover, a mass average particle diameter (D50) and a particle diameter distribution width of the water absorbent resin are measured according to a method similar to a method disclosed herein.

The term "absorbent polymer" as used herein refers to water-swellable, water-insoluble organic or inorganic materials including absorbent polymers and absorbent polymer compositions capable, under the most favorable conditions, of absorbing at least about 10 times their weight, or at least about 15 times their weight, or at least about 25 times their weight in an aqueous solution containing 0.9 weight percent sodium chloride.

The term "surface crosslinking" as used herein refers to the level of functional crosslinks in the vicinity of the surface of the absorbent polymer particle, which is generally higher than the level of functional crosslinks in the interior of the absorbent polymer particle. As used herein, "surface" describes the outer-facing boundaries of the particle.

As used herein, a range "X to Y" means "X or more (higher) and Y or less (lower)". Moreover, "weight" is synonymous with "mass", "wt %" is synonymous with "mass %", and "parts by weight" is synonymous with "parts by mass". Moreover, unless otherwise noted, "ppm" means "ppm by weight" or "ppm by mass".

DESCRIPTION OF THE FIGURES

The foregoing and other features, aspects and advantages of the present invention will become better understood with regard to the following description, appended claims and accompanying figures where FIG. 1 shows a comparison of the (foamed) polymer structures of FIGS. 1A, 1B and 1C.

FIG. 2 shows shoe sole inserts cut out of (foamed) polymer sheets as represented by FIGS. 2A and 2B.

FIG. 3 shows a companion of the polymeric foam structure of FIGS. 3A and 3B.

FIG. 4 shows a comparison of the shoe sole inserts that were cut out of the (foamed) polymer sheets of FIGS. 4A, 4B and 4C.

FIG. 5 shows a comparison of the (foamed) polymer structure of FIGS. 5A and 5B.

FIG. 6 shows a comparison of the (foamed) polymer structure of FIGS. 6A and 6B.

FIG. 7 shows a comparison of the polymeric foam structures of FIGS. 7A, 7B and 7C.

DETAILED DESCRIPTION OF THE INVENTION

Figures 1A, 1B, 1C:
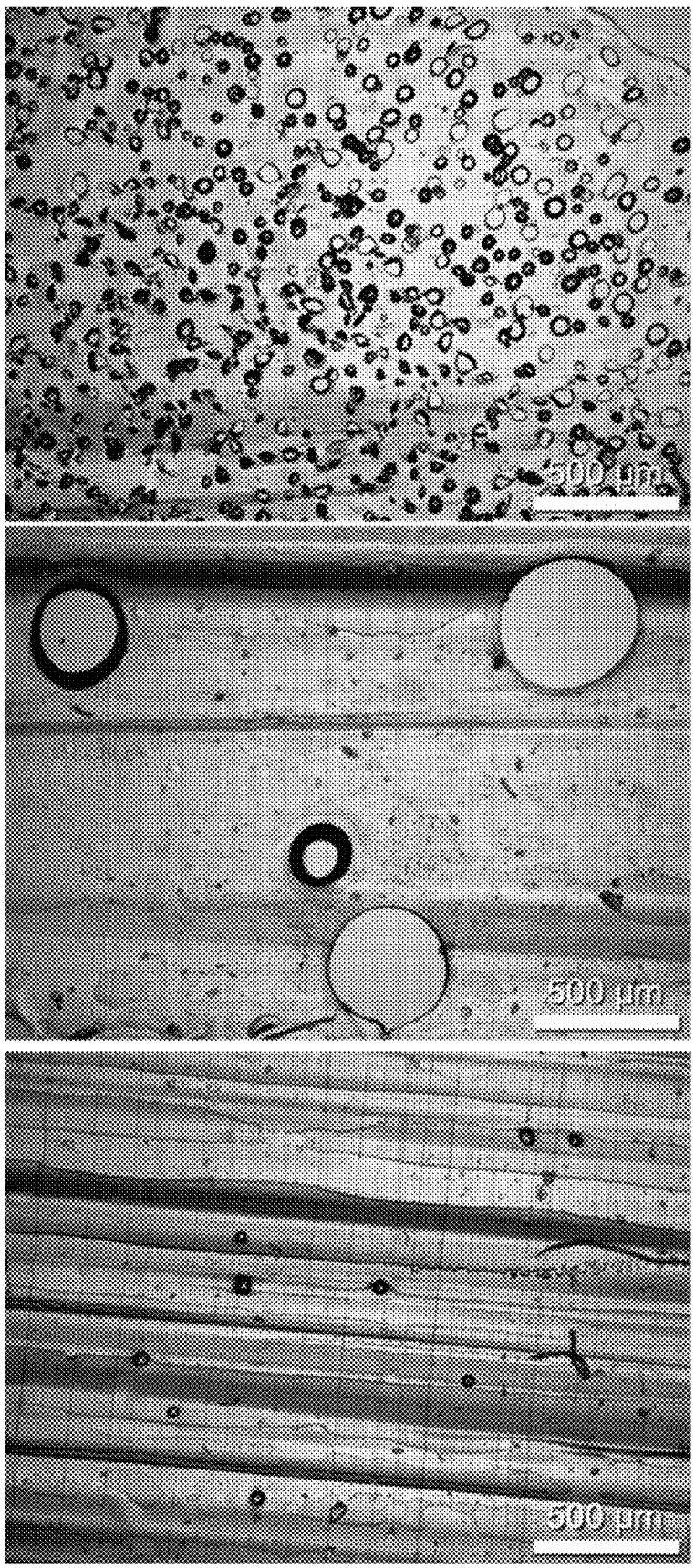
FIG. 1A shows a microscopic image of a polymer produced from monomer without blowing agent and without ultrasonic treatment.
FIG. 1B shows a microscopic image of a polymer produced from monomer with a blowing agent but without ultrasonic treatment.
FIG. 1C shows a microscopic image of a polymer produced from monomer with a blowing agent and ultrasonic treatment according to the invention.

While typical aspects of embodiment and/or embodiments have been set forth for the purpose of illustration, this Detailed Description of the Invention—should not be deemed to be a limitation on the scope of the invention. Accordingly, various modifications, adaptations, and alternatives may occur to one skilled in the art without departing from the spirit and scope of the present invention. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

In accordance with the invention, processes to make polymeric foam sheets, polymers and absorbent polymers and absorbent particles as set forth in the claims can be achieved using the methods described herein.

An absorbent polymer, which is used as a main component in the particulate water absorbing agent that is obtained by the producing method of the present invention, is in general a polyacrylic acid (salt)-based absorbent polymer, and is a water-swelling and water-insoluble crosslinked polymer. This water-swelling and water-insoluble crosslinked polymer contains an acrylic acid (salt) as a polymerized unsaturated acid group containing monomer in a repeating unit (except for crosslinking agent later described), in an amount of from 30 mol % to 100 mol %, or from 50 mol % to 100 mol %, or from 70 mol % to 100 mol %, or from 90 mol % to 100 mol %, or substantially 100 mol %.

An acid group of a monomer before or after polymerization is generally neutralized. A neutralized salt may be a salt of an alkali metal or an ammonium salt, potentially with some di-, tri-, or polyvalent cations added to impart specific properties such as, for example, absorption speed. Sodium is the most common neutralization cation, and preferable neutralization degrees are, 20 mol % to 100 mol %, or 40 mol % to 99 mol %, or 50 mol % to 90 mol % of the acid groups to be neutralized. The neutralization can be carried out before polymerization, or can be carried out on a hydrogel after polymerization, or both the neutralizations can be carried out. Generally, the neutralization is carried out before polymerization by adding a neutralization agent to the monomer solution or the monomer to a solution of the neutralizing agent.

Monomer Solution

The process to make the polymeric foam of the present invention includes an initial step of providing a monomer solution comprising a monomer, crosslinker and an initiator. A suitable monomer, or monomer combination, may include ethylenically unsaturated compounds where free-radical initiation and propagation will yield a polymer suitable for processing and application as a polymeric foam. Monomers with anionic functionalities, such as carboxylic or sulfonic acid groups are suitable, and those monomers may also have alkyl, amido, or other such side groups. Monomers with no acidic functionality may also be included, though it is desirable that at least 50-99.9 mol % of the monomers in the polymer backbone have acid/acid-salt group functionalities, and it is particularly desirable that those acid/acid-salt groups be carboxylic acid/carboxylate groups.

A suitable polymerizable unsaturated acid group containing monomer includes any of those containing acid groups, such as acrylic acid or methacrylic acid; or 2-acrylamido-2-methylpropanesulfonic acid, their salts, or solutions thereof. It is desirable for at least about 50%, and more desirable for at least about 75% of the acid groups to be carboxylic acid/carboxylate groups.

In some aspects, the monomer solution may further include a second suitable polymerizable unsaturated acid group containing monomer that can be copolymerized with the ethylenically unsaturated monomer may include, but is not limited to acrylamide, methacrylamide, hydroxyethyl acrylate, dimethylaminoalkyl (meth)-acrylate, ethoxylated (meth)-acrylates, dimethylaminopropylacrylamide, or acrylamidopropyltrimethylammonium chloride. Such monomer may be present in a range of from 0 wt % to about 40 wt % of the copolymerized monomer.

The monomer solution may further include a neutralization agent in order to neutralize the acid groups of the polymerizable unsaturated acid group containing monomer. Preferably, 20 mol % to 100 mol %, or from 40 mol % to 99 mol %, or from 50 mol % to 90 mol % of the acid groups are neutralized. The neutralization agent may include an alkali base material including sodium, potassium or ammonium salts resulting in the acid groups being present as the corresponding salts. The alkali base may be the hydroxide, carbonate, or bicarbonate salt of sodium, potassium, or ammonia, or the like. It is noted that the neutralization may be achieved by either adding the alkali base to the monomer solution or adding the monomer such as acrylic acid to the alkali base.

According to one method, the polymerizable acidic monomer is partially neutralized by either adding the neutralization agent, such as sodium hydroxide, to the monomer or by adding the polymerizable acidic monomer to a neutralization agent. Then the partially neutralized monomer, such as acrylic acid, is converted into a gel by polymerization in the presence of crosslinking agents and any further components. The gel is optionally comminuted into particulate absorbent polymer.

A blowing agent or foaming agent is added to the monomer solution before polymerization. The amount of blowing agent added must be adapted to the individual application, but is generally in the range of 0.01 wt % to 5 wt %, more preferably 0.05 wt % to 2 wt %, based on the total weight of the monomer solution. The blowing agent may be a compound that decomposes by chemical reaction to produce a gas. The blowing agents used may be carbonates from the group of lithium carbonate, sodium carbonate, potassium carbonate, or higher-valence metal ions such as calcium carbonate, magnesium carbonate, or solutions thereof. Further compounds used may also be granulated carbonates, which are also produced as mixed salts of a carbonate and/or percarbonate with a further salt which functions as an outer layer, for example, a sulfate compound.

The blowing agents used may also be bicarbonates from the group of lithium bicarbonate, sodium bicarbonate, and potassium bicarbonate; or higher valency metal ions such as calcium bicarbonate, magnesium carbonate, or solutions thereof. Granulated bicarbonates may also be used.

An advantage of the invention is that the blowing agent can be added in a single step prior to the polymerization or in the case of a gas, at a single pressure prior to the polymerization. No cycling of pressures or repeated applications at alternating pressures are needed. It is also not necessary to continue adding blowing agent throughout the entire polymerization nor even after gelation of the polymer during polymerization.

In order to achieve the desired foam porosity, the blowing agent or gas amount needs to be adjusted to the treatment conditions, formulation and the type of blowing agent.

Preferably, the amount of carbonate or bicarbonate blowing agent is between 0.01 wt % to 5 wt %, more preferably 0.05 wt % to 2 wt %, and most preferably 0.1 wt % to 1 wt % based on the weight of total monomer solution.

It is also contemplated that the blowing agent may be carbon dioxide.

The blowing agent may also be a compound that thermally decomposes to release a gas. Examples of such blowing agents would include azo compounds, carbamates, urea and the like.

Accordingly, in an embodiment, the blowing agent used can be a carbonate or bicarbonate based compound or carbon dioxide.

In another embodiment, the blowing agent may be a dissolved gas that forms bubbles as a reaction to change in pressure or temperature of the monomer solution, creating a change in the solubility of the gas.

The monomer solution of the invention also includes from about 0.001 wt % to about 5 wt %, and preferably from about 0.05 wt % to about 3 wt % based on the total amount of the polymerizable unsaturated acid group containing monomer of at least one internal crosslinking agent. The internal crosslinking agent generally has at least two ethylenically unsaturated double bonds or one ethylenically unsaturated double bond and one functional group which is reactive towards acid groups of the polymerizable unsaturated acid group containing monomers or several functional groups which are reactive towards acid groups can be used as the internal crosslinking component and which is present during the polymerization of the polymerizable unsaturated acid group containing monomers.

Examples of internal crosslinking agents used in absorbent polymers include aliphatic unsaturated amides, such as methylenebisacryl- or -methacrylamide or ethylenebisacrylamide, and furthermore aliphatic esters of polyols or alkoxylated polyols with ethylenically unsaturated acids, such as di(meth)acrylates or tri(meth)acrylates of butanediol or ethylene glycol, polyglycols or trimethylolpropane, di- and triacrylate esters of trimethylolpropane which is preferably oxyalkylated, preferably ethoxylated, with 1 to 30 mol of alkylene oxide, acrylate and methacrylate esters of glycerol and pentaerythritol and of glycerol and pentaerythritol oxyethylated with preferably 1 to 30 mol of ethylene oxide and furthermore allyl compounds, such as allyl (meth)acrylate, alkoxylated allyl (meth)acrylate reacted with preferably 1 to 30 mol of ethylene oxide, triallyl cyanurate, triallyl isocyanurate, maleic acid diallyl ester, poly-allyl esters, vinyl trimethoxysilane, vinyl triethoxysilane, polysiloxane comprising at least two vinyl groups, tetraallyloxyethane, tetraallyloxyethane, triallylamine, tetraallylethylenediamine, diols, polyols, hydroxy allyl or acrylate compounds and allyl esters of phosphoric acid or phosphorous acid, and furthermore monomers which are capable of crosslinking, such as N-methylol compounds of unsaturated amides, such as of methacrylamide or acrylamide, and the ethers derived therefrom. Ionic crosslinkers such as aluminum metal salts may also be employed. Solutions of the crosslinking agents mentioned can also be employed.

The absorbent polymer may include from about 0.001 wt % to about 5 wt % based on the total amount of the polymerizable unsaturated acid group containing monomer of additional internal crosslinkers which may comprise compositions comprising at least two ethylenically unsaturated double-bonds, for example, methylenebisacrylamide or -methacrylamide or ethylenebisacrylamide; additionally, esters of unsaturated mono- or polycarboxylic acids of polyols, such as, diacrylates or triacrylates, e.g., butanediol- or ethylene glycol diacrylate or -methacrylate; trimethylolpropane triacrylate, as well as their alkoxylated derivatives; additionally, allyl compounds, such as allyl (meth)acrylate, triallyl cyanurate, maleic acid diallyl ester, polyallyl ester, tetraallyloxyethane, di- and triallylamine, tetraallylethylenediamine, allyl esters of phosphoric acid or phosphorous acid. Moreover, compounds having at least one functional group reactive towards acid groups may also be used. Examples thereof include N-methylol compounds of amides, such as methacrylamide or acrylamide, and the ethers derived there from, as well as di- and polyglycidyl compounds.

The monomer solution further includes an initiator. Suitable initiators include, but are not limited to, azo or peroxo compounds, thermal or pyrolytic initiators, redox systems, photolytic or UV initiators (sensitizers or compounds that fragment to generate radicals on exposure to UV), and/or radiation are used for initiation of the free-radical polymerization.

The monomer solution may include a polymerization initiator which is selected as appropriate in accordance with a form of polymerization, and is not limited to a particular one. The amount of the polymerization initiator used is preferably from 0.0001 mol % to 1 mol %, and more preferably from 0.001 mol % to 0.5 mol %, relative to the total moles of monomer in the monomer solution.

Examples of the photolytic polymerization initiator encompass a benzoin derivative, a benzil derivative, an acetophenone derivative, a benzophenone derivative, an azo compound, and the like.

Examples of pyrolytic polymerization initiators encompass persulfates such as sodium persulfate, potassium persulfate, and ammonium persulfate; peroxides such as hydrogen peroxide, t-butyl peroxide, and methyl ethyl ketone peroxide; azo compounds such as an azonitrile compound, an azoamidine compound, a cyclic azoamidine compound, an azoamide compound, an alkylazo compound, 2,2'-azobis (2-amidinopropane)dihydrochloride, and 2,2'-azobis[2-(2-imidazoline-2-yl)propane]dihydrochloride; and the like.

Examples of the redox polymerization initiators encompass a system using a combination of (i) an oxidizing compound such as persulfate, peroxide, or the like and (ii) a reducing compound such as L-ascorbic acid, sodium hydrogen sulfite, or the like.

It is often desirable to use a combination of different initiator types. For example, photolytic polymerization initiators can be used in combination with pyrolytic or redox polymerization initiators.

According to the present invention, the monomer solution may further include, if needed, preferably 5 mass % or lower, and more preferably 1 mass % or lower of a water soluble polymer, a surfactant, a deodorant agent, an antibacterial agent, a plasticizer, a perfume, a pigment, a dye, a hydrophilic short fiber, inorganic powder such as silicon dioxide or titanium oxide, a thermoplastic resin such as polyethylene or polypropylene, a chain transfer agent such as hypophosphorous acid (salt), or the like. Furthermore, the monomer solution may include up to about 20 wt % absorbent polymer fines having a particle size of about 150 μm or less.

After preparation, the monomer solution may be cooled to a temperature of from about 0° C. to 20° C., or from 3° C. to 10° C. Nitrogen or other inert gas may be bubbled through the monomer solution to remove oxygen. In one embodiment, carbon dioxide is used to both purge the monomer of oxygen and to act as a blowing agent to create bubbles. The monomer solution may also be polymerized at ambient or elevated temperature optionally without nitrogen sparging before polymerization. In one embodiment the monomer solution is heated to 50° C. to 100° C. before polymerization.

The monomer solution may be characterized by several parameters such as solids and viscosity. The monomer solution may have solids content of from about 25% to about 60%, or from about 30% to about 40% solids. The monomer solution may have a viscosity of from about 5 centipoise to about 200,000 centipoise, preferably from about 7 centipoise to about 50,000 centipoise, more preferably from about 10 centipoise to about 10,000 centipoise.

Ultrasonic Treatment

The monomer solution is subjected to ultrasonic waves. The monomer solution can be treated with ultrasound during addition of the blowing agent or gas. Most preferably, the monomer is subjected to ultrasonic waves after addition of the blowing agent or gas. The blowing agent can be added as a solid, as an aqueous solution or a gas can be used. Solid blowing agents like sodium bicarbonate and sodium carbonate are preferably dissolved in water before addition to the monomer solution.

The ultrasonic treatment of the monomer solution is accomplished before gelation of the monomer during polymerization, preferably before initiation of the polymerization.

Ultrasonic treatment is defined as utilizing an ultrasonic power generator in combination with an ultrasonic transducer and sonotorode, surface, or probe to impart ultrasonic waves and energy into a medium of interest. Ultrasonic treatment according to this invention can be performed with a sonotrode, surface, or probe, more preferably with a sonotorode or probe, and most preferably with a sonotrode.

For the purposes of this invention, the frequency of a probe or vibrating surface for ultrasonic treatment can be between 10 kHz to 3000 kHz, more preferably between 15 kHz and 180 kHz and most preferably between 18 kHz and 45 kHz.

The ultrasonic waves can be introduced into the monomer solution by e.g., a vibrating surface as present in ultrasonic baths or submersible transducers, or by exposing the monomer directly to an ultrasonic probe. A vibrating surface is created by attaching one or more transducers to the surface.

Ultrasonic probes can have different shapes and can be for example a cylindrical probe or form a probe with several bumps, or a bar. Ultrasonic probes can be inserted into a flow cell and be sealed at a point with little vibration. The monomer can be exposed to direct contact with the vibrating surface of the probe. Examples for a transducer driving a probe directly is the UIP500hdt with e.g. a 34 mm block sonotrode as a probe and is manufactured by Hielscher USA Inc., New Jersey.

An example for a treatment with vibrating surfaces is a flow through reactor UPR 1000s from the Ultrasonic Power Corporation, Illinois.

Depending on the equipment manufacturer, the amplitude can be adjusted within a certain range. Adjusting the amplitude of ultrasonic vibration changes the amount of energy input into the material being treated with ultrasonic waves. The Ultrasonic Power Corporation model 5400 Generators allow variation of the intensity by adjustments from minimum to maximum on the generator. This intensity setting affects the amplitude. For Hielscher devices, such as the UIP500hdt, the amplitude can be adjusted from 20 to 100%. The preferable range for ultrasonic processing is from minimum to maximum intensity as well as a setting of the amplitude from 1% to 100%. More preferably is an amplitude setting between 20% to 100%.

The energy transmitted into the monomer through ultrasonic processing is preferably in the range from 0.005 kJ/kg monomer solution to 5 kJ/kg monomer solution and is more preferably between 0.01 kJ/kg monomer solutions to 3 kJ/kg monomer and most preferably between 0.1 kJ/kg monomer solutions to 2 kJ/kg monomer.

Generally, direct contact between the monomer solution and the vibrating surface is desired for simplicity. The ultrasonic treatment can be performed in batches or in a continuous process, for example with a flow cell or flow reactor.

Ultrasonic treatment times depend on the conditions and can vary widely. The required treatment time depends e.g. on probe size, amplitude, mass to be treated and blowing agent or gas amount. In one embodiment, when performed in a batch-wise manner, ultrasonic treatment times of less than 10 min are preferred, more preferably less than 1 min. In another embodiment, when performed continuously in a flow-through cell, ultrasonic treatment times of less than 1 min are preferred, more preferably less than 30 s. Shorter treatment times are preferred due to improved equipment utilization. One skilled in the art can easily match the treatment time, amplitude and other parameters to the monomer amount to achieve the desired end product properties.

The time between the ultrasonic treatment of the monomer solution and initiation of the polymerization is preferably less than 1 hour, more preferably less than 2 minutes and most preferably less than 30 seconds.

An advantage of the invention is that the application of the ultrasonic treatment is performed for a short duration to the monomer solution. The ultrasonic radiation is used to influence the bubble size in the monomer solution before polymerization. Ultrasonic treatment is not needed for the entire duration of the polymerization reaction as in prior art such as U.S. Pat. No. 5,859,077. Nor is it required after gelation of the polymer during polymerization.

The ultrasonic treatment, combined with a blowing agent according to this invention, allows precise control of the bubble amount and size and therefore is able to control the foam structure after gelation. For example, for many applications the generation of a large amount of small diameter bubbles is preferable over the generation of fewer larger diameter bubbles by the same amount of blowing agent. The larger number of smaller diameter bubbles in the monomer are immobilized during the gelation and remain as pores in the final product. The polymeric foam that is created with ultrasonically treated monomer shows increased compressibility compared to a polymeric foam without an ultrasonic treatment. For many applications, such as shoe sole inserts, among others, increase compressibility is a highly desirable attribute. The invention, therefore, can provide a process for producing polymeric foam with a specific compressibility by a simple, efficient and economical process.

The compressibility of a polymeric foam can be measured by a number of standard methods well known in material science. One especially useful measure is Young's modulus, sometimes called elastic modulus, which can be determined using a Zwick tester or Anton Paar rheometer in the methods described herein. For the purposes of this invention, a lower Young's modulus indicates a better compressibility and more desirable properties relating to shock absorption in products such as shoe sole inserts and many other applications.

The polymeric foam is also more robust and resistant to damage when the foam is composed of a larger number of smaller diameter pores than with a fewer number of much larger diameter pores that can serve as weak points in the foam structure. The larger number of smaller diameter pores homogeneously distributed also result in a foam that is more uniform in properties throughout the foam. Additionally, foamed sheets and foamed particles generated from the polymeric foam show improved absorption speed and better wicking of moisture.

Polymerization

The foamed aqueous monomer solution is polymerized to form a foamed microcellular polymer. The polymerization can be conducted by any of the methods well known in the art and may be conducted batch-wise or in a continuous fashion. The polymerization reactor form is not particularly limited and may be a continuous moving belt, a tube, a kneader, a stirred reactor, a flat thin film, a droplet, a strand, or a depression in the shape of the final desired polymer shape. The monomer may also be polymerized in a suspension or the like.

In gel polymerization, a preferred embodiment, a monomer solution of primarily acrylic acid, neutralizing agent, water, cross-linking agents, and initiator chemicals are blended and placed into a "reactor", which may be a continuous belt, trays, a kneader or the like. Shortly after the polymerization is initiated, the liquid monomer polymerizes to a solid gel. For example, with a continuous belt, the monomer solution is contained on the continuous belt by dams or sloped sides, wherein polymerization is initiated. The process results in a continuous "slab" of absorbent polymer, generally called a polymer hydrogel, on the belt, wherein the slab has general dimensions of thickness from about 3 mm to about 300 mm and a width of from about 800 mm to about 1500 mm for production purposes. Polymerization of the polymer for lab purposes is generally, for example done in a plastic tray or a bucket, and a gel thickness of about 3 mm to about 100 mm. In another preferred embodiment, the monomer is polymerized in forms or depressions that approximate the final desired shape of the polymeric foam, such as that of shoe sole inserts.

Droplets or strands also can be considered as reactors where the liquid monomer polymerizes to form a solid gel in the very early stages of polymerization.

An advantage of the invention is that the blowing agent and ultrasound treatment are added for a short duration to the monomer solution before polymerization. This is possible external to the polymerization reactor itself. After treatment, the monomer solution may be polymerized in any number of different reactor types or forms. It is not limited to the use of a single, special, complicated type of reactor to try to force bubbles into the gel during and after the gelation polymerization using constant stiffing or multiple blowing agent additions under alternating pressures as attempted in prior art.

Cutting

In an embodiment, the polymeric foam absorbent polymer hydrogel obtained by polymerization (hereinafter, sometimes referred to as "hydrogel") may be left as a sheet or it may be cut to smaller sizes, for example, into shoe-sole-shapes that are suitable for insertion into shoes. The hydrogel may also be cut into regular or irregular granules (e.g., with a mass average particle length preferably of 0.1 mm to 10 mm, or more preferably from 0.5 mm to 3 mm) with cutting apparatus known to the skilled artisan, such as extruders, knives, rotating choppers and the like.

In one embodiment, a resulting continuous sheet or slab of absorbent polymer hydrogel may be cut to a desired shape, or chopped and extruded with a commercial extruder, followed by drying in a forced air oven to make a final product moisture level of less than 20 wt % water. The dried absorbent polymer may then be crushed and or milled and sieved. In a preferred embodiment, it is desirable to remove particles greater than 1000 μm, or greater than 850 μm and smaller than 150 μm, to form what is generally referred to as particulate absorbent polymer.

In another embodiment, the polymerized gel is not dried to a moisture level of less than 20 wt % water, but kept at a level of about 20 wt % to 80 wt % water, so that the additional water in the polymer can provide flexibility or other desirable properties.

Surface Crosslinking and Treatment

The absorbent polymers or particulate absorbent polymers may be surface treated with additional chemicals and treatments as set forth herein. In particular, the surface of the particulate absorbent polymer may be additionally crosslinked, generally referred to as surface crosslinking, by the addition of a surface crosslinking agent and heat-treatment. In general, surface crosslinking is a process to increase the crosslink density of the polymer matrix in the vicinity of the (particulate) absorbent polymer surface with respect to the crosslinking density of the (particle) interior. The amount of the surface crosslinking agent may be present in an amount of from about 0.01 wt % to about 5 wt %, or such as from about 0.1 wt % to about 3 wt %, or such as from about 0.1 wt % to about 1 wt % by weight, based on the weight of the dry (particulate) absorbent polymer.

Desirable surface crosslinking agents include chemicals with one or more functional groups that are reactive toward pendant groups of the polymer chains, typically the acid groups. Surface crosslinking agents comprise functional groups which react with functional groups of a polymer structure in a condensation reaction (condensation crosslinker), in an addition reaction or in a ring opening reaction.

These compounds may include, for example, polyols including di- or polyfunctional alcohols, carbonates, amines and polyfunctional amines, β-hydroxyalkylamides, polyfunctional amido amines, oxazolidinones, epoxides and polyfunctional epoxides, diglycidyl ethers, and the like, and alkoxylated derivatives, thereof, including propane diol, butane diol, ethylene glycol diglycidyl ether, diethylene glycol, triethylene glycol, polyethylene glycol, glycerine, polyglycerine, propylene glycol, diethanolamine, triethanolamine, polyoxypropylene, oxyethylene-oxypropylene block copolymers, sorbitan fatty acid esters, polyoxyethylene sorbitan fatty acid esters, trimethylolpropane, pentaerythritol, polyvinyl alcohol, sorbitol, 2-hydroxyethyloxazolidin-2-one, oxazolidin-2-one, 1,3-propanediol. 1,3-dioxolan-2-one (ethylene carbonate), 4-methyl-1,3-dioxolan-2-one (propylene carbonate), or 4,5-dimethyl-1,3-dioxolan-2-one and alkoxylated derivatives, thereof.

After the (particulate) absorbent polymer has been brought into contact with the surface crosslinking agent, or with the fluid comprising the surface crosslinking agent, the treated (particulate) absorbent polymer is heat treated to a temperature of from about 50° C. to about 300° C., or from about 75° C. to about 275° C., or from about 150° C. to about 250° C., and for a time of from about 5 minutes to about 90 minutes dependent on the temperature, so that the outer region of the (particulate) absorbent polymer is more strongly crosslinked compared to the inner region (i.e., surface crosslinking). The duration of the heat treatment is limited by the risk that the desired property profile of the polymer structures will be destroyed as a result of the effect of heat.

In one particular aspect of surface crosslinking, the (particulate) absorbent polymer is surface-treated with ethylene carbonate followed by heating to effect surface crosslinking of the absorbent polymer particle, which increases the surface crosslinking density and the gel strength characteristics of the (particulate) absorbent polymer. More specifically, the surface crosslinking agent is coated onto the (particulate) absorbent polymer by mixing the particulate absorbent polymer with an aqueous alcoholic solution of the ethylene carbonate surface crosslinking agent. The amount of alcohol in the aqueous alcoholic solution may be determined by the solubility of the alkylene carbonate and is kept as low as possible for various reasons, for instance, for protection against explosions. Suitable alcohols are methanol, isopropanol, ethanol, butanol, or butyl glycol, as well as solutions of these alcohols. In some aspects, the solvent desirably is water, which typically is used in an amount of about 0.3% by weight to about 5.0 wt %, based on the weight of the dry (particulate) absorbent polymer composition. In still other aspects, the ethylene carbonate surface crosslinking agent may be applied with an inorganic carrier material, such as silicon dioxide ($SiO_2$), or in a vapor state by sublimation of the ethylene carbonate.

To achieve the desired surface crosslinking properties, the surface crosslinking agents such as ethylene carbonate should be distributed evenly on the particulate absorbent polymer. For this purpose, mixing is effected in suitable mixers known in the art, such as fluidized bed mixers, paddle mixers, rotary drum mixers, or twin-worm mixers. It is also possible to carry out the coating of the (particulate) absorbent polymer during one of the process steps in the production of the (particulate) absorbent polymer. The heat treatment, which follows the coating treatment of the (particulate) absorbent polymer, may be carried out as follows. In general, the heat treatment is at a temperature of from about 100° C. to about 300° C. Lower temperatures are possible if highly reactive epoxide crosslinking agents are used. However, if an ethylene carbonate is used, then the thermal treatment is suitably at a temperature of from about 150° C. to about 250° C. In this particular aspect, the treatment temperature depends on the dwell time and the kind of ethylene carbonate. For example, at a temperature of about 150° C., the thermal treatment is carried out for one hour or longer. In contrast, at a temperature of about 250° C., a few minutes (e.g., from about 0.5 minutes to about 5 minutes) are sufficient to achieve the desired surface crosslinking properties. The thermal treatment may be carried out in conventional dryers or ovens known in the art. Surface crosslinking may also be carried out on the polymeric foam sheet if so desired.

In addition to surface crosslinking, the absorbent polymer may be further surface treated with other chemical compositions, with or after the surface crosslinking step. The absorbent polymeric foam, and the particulate absorbent polymer cut from the polymeric foam, according to the invention may be treated with from about 0.001% to about 10% by weight, or from 0.01% to about 7.5% by weight, or from 0.1% to about 5% by weight, of a salt or salts, in each case based on the absorbent weight of a salt or salts, in each case, wherein the salt comprises a divalent or higher-valent cation of a metal, and at least one organic base as an anion.

The divalent or higher-valent cation of a metal may be selected from the group consisting of $Mg^{2+}$, $Ca^{2+}$, $Ba^{2+}$, $Al^{3+}$, $Fe^{2+}$, $Fe^{3+}$, $Ga^{3+}$, $Ti^{4+}$, $Zr^{4+}$, $Cu^{2+}$, and $Zn^{2+}$. The organic base may be an at least partially deprotonated mono-, di- or tri-carboxylic acid, or deprotonated monocarboxylic acids. Also included may be hydroxycarboxylic acids, such as at least partially deprotonated mono-, di- or hydroxy-tri-carboxylic acids, and monohydroxycarboxylic acids.

Anions may include the corresponding bases of the following acids: anisic acid, benzoic acid, formic acid, valeric acid, citric acid, glyoxylic acid, glycolic acid, glycerolphosphoric acid, glutaric acid, chloracetic acid, chloropropionic acid, cinnamic acid, succinic acid, acetic acid, tartaric acid, lactic acid, pyruvic acid, fumaric acid, propionic acid, 3-hydroxypropionic acid, malonic acid, maleic acid, butyric acid, isobutyric acid, imidinoacetic acid, malic acid, isothionic acid, methylmaleic acid, itaconic acid, crotonic acid, oxalic acid, salicylic acid, gluconic acid, gallic acid, sorbic acid, fatty acids, such as stearic acid and adipic acid, and p-hydroxybenzoic acid, including tartrate and lactate.

In another embodiment of the process of the invention, the salt used may be a salt that comprises aluminum lactate. At least about 50% by weight, or at least about 75% by weight, or 100% by weight, of that salt are based on aluminum lactate. In addition to the aluminum lactate, it may be possible for one or two or more further cations to be present. Such a cation may be selected from monovalent, divalent or higher-valent cations of a metal selected in turn from the group consisting of $Mg^{2+}$, $Ca^{2+}$, $Ba^{2+}$, $Al^{3+}$, $Fe^{2+}$, $Fe^{3+}$, $Ga^{3+}$, $Ti^{4+}$, $Zr^{4+}$, $Cu^{2+}$ and $Zn^{2+}$. Moreover, in addition to the aluminum lactate, it is also possible for further anions to be present in the salt. Furthermore, in addition to aluminum lactate, it is also possible for oxides or mixed oxides of further metals to be present, such as being given to the oxides of the metal ions mentioned in this section. For example, in connection with the solution containing the salt, the solution may contain a secondary salt an alkali metal or alkaline earth metal salt, or an alkali metal salt of one of the above-mentioned anions, or the anion of the main salt chiefly present in the solution. These include lithium lactate and sodium lactate. The amount of the secondary salt may be from 0.001% to about 25% by weight, or from 0.01% to about 17% by weight, or from about 0.1% to about 12% by weight, in each case based on the main salt.

In another embodiment of the present invention, an anion different from the organic base may be used. The anion may be an inorganic base. That inorganic base may be a deprotonated inorganic acid. Such acids are able to release two or more protons. They include acids containing sulfur, nitrogen, or phosphorus. Acids containing sulfur, especially sulfuric acid and accordingly sulfate as the salt thereof, may be used for the base. In accordance with another embodiment of the process of the invention, there may be used a further salt comprising aluminum sulfate. At least about 50% by weight, or at least about 75% by weight, or 100% by weight, of that salt may be based on aluminum sulfate. The two different anions may be used in a ratio of from about 1:100 to about 100:1, or in a ratio of from about 1:10 to about 10:1, or from about 1:5 to about 5:1.

The salt may be brought into contact with the untreated, absorbent polymer by mixing together the two components, suitable mixing apparatus for the purpose being such as a Patterson Kelley mixer, DRAIS turbulent mixer, Lödige mixer, Ruberg mixer, screw mixer, plate mixer, and fluidized bed mixer or continuously operating vertical or horizontal mixers in which the polymer structure is mixed at high frequency by means of rotating blades (Schugi mixer).

Furthermore, the salt may be brought into contact with the untreated, absorbent polymer in the form of a fluid, comprising a solvent and the salt dissolved or dispersed in that solvent, or in dry form as a salt powder. Suitable solvents, in addition to water, may be water-miscible, organic solvents such as, for example, methanol, ethanol, 1-propanol, 2-propanol, 1,2-propanediol, 1,3-propanediol, 1-butanol, 2-butanol, tert-butanol, isobutanol, or solutions of organic solvents or solutions of water with one or more of those organic solvents, such as being given to water as solvent. If the untreated, absorbent polymer is brought into contact with the fluid comprising the solvent and the salt, such that the fluid may contain the salt in an amount in a range of from about 0.1% to about 50% by weight, or from about 1% to about 40% by weight, or from about 5% to about 25% by weight, in each case based on the total weight of the fluid.

The absorbent polymer composition may include from about 0 wt % to about 5 wt %, or from about 0.001 wt % to about 3 wt %, or from about 0.01 wt % to about 2 wt % based on the weight of the dry absorbent polymer composition of water-insoluble, inorganic powder. Examples of insoluble, inorganic powders include silicon dioxide, silica, titanium dioxide, aluminum oxide, magnesium oxide, zinc oxide, talc, calcium phosphate, clays, diatomaceous earth, zeolites, bentonite, kaolin, hydrotalcite, activated clays, etc. The insoluble inorganic powder additive may be a single compound or a solution of compounds selected from the above list. Examples of silica include fumed silica, precipitated silica, silicon dioxide, silicic acid, and silicates. In some particular aspects, microscopic non-crystalline silicon dioxide is desirable. Products include SIPERNAT® 22S and AEROSIL® 200 available from Evonik Corporation, Parsippany, N.J. In some aspects, the particle diameter of the inorganic powder can be 1,000 μm or smaller, such as 100 μm or smaller.

The absorbent polymer may also be further treated by the addition of 0 wt % to about 30 wt %, or from about 0.001 wt % to about 25 wt %, or from about 0.01 wt % to about 20 wt % based on the weight of the dry particulate absorbent polymer composition, of water-soluble polymers, such as partly or completely hydrolyzed polyvinyl acetate, polyvinylpyrrolidone, starch or starch derivatives, polyglycols or polyacrylic acids. Preferred water-soluble polymers are starch and polyvinyl alcohol.

The absorbent polymer may also include from 0 wt % to about 5 wt %, or from about 0.001 wt % to about 3 wt %, or from about 0.01 wt % to about 2 wt % based on the weight of the dry absorbent polymer composition, of dedusting agents, such as hydrophilic and hydrophobic dedusting agents such as those described in U.S. Pat. Nos. 6,090,875 and 5,994,440.

In some aspects, additional surface additives may optionally be employed with the absorbent polymer composition, such as odor-binding substances, such as cyclodextrins, zeolites, inorganic or organic salts, and similar materials; anti-microbials, anti-odor compounds, anti-stickiness agents, anti-caking additives, flow modification agents, surfactants, viscosity modifiers, urine stability promoters and the like. Anti-bacterial and anti-odor agents may be especially advantageous for shoe sole inserts and other applications with direct or indirect contact to the body.

In other embodiments the absorbent polymer may include 0.0001 wt % to 5 wt % additives that enhance whiteness of the polymer or the long-term color stability such as against darkening, yellowing or browning. Such additives are well known in the art and include anti-oxidants, sulfur- and phosphorous-containing compounds, chelating agents, optical brighteners and the like. Preferred additives for color stability are 2-hydroxy-2-sulfonato acetic acid, bisulfites, phosphonates, ethylenediaminetetraaceticacid, ethylenediamine-N,N'-disuccinic acid, diethylenediaminepentaacetic acid, their salts and derivatives, and solutions thereof.

The absorbent polymer of the present invention may be, after the heat treatment step, treated with an aqueous solution to adjust the water content of the absorbent polymer.

In some embodiments, it may be advantageous for the final absorbent polymer to have a water content of as high as 80 wt %. In this embodiment, the treated absorbent polymer composition has a water content of about 20 wt % to about 80 wt % based on the total weight of the absorbent polymer. In some embodiments, the treated absorbent polymer has a water content of about 40 wt % to about 60 wt % based on the total weight of the absorbent polymer. Water or moisture content is measured according to the previously named WSP 230.3 (10) test method.

The absorbent polymer of the present invention exhibits certain characteristics, or properties, as measured by Centrifuge Retention Capacity (CRC), which measures the ability of the (particulate) absorbent polymer to retain liquid therein after being saturated and subjected to centrifugation under controlled conditions. The resultant retention capacity is stated as grams of liquid retained per gram weight of the sample (g/g). All values of CRC, set forth herein are to be understood as being determined by the CRC Test as provided herein.

The (particulate) absorbent polymer made by a process of the present invention may have a CRC of from about 20 g/g to about 50 g/g, or from about 25 g/g to about 45 g/g.

When the state of the polymer is a particulate absorbent polymer, the particulate absorbent polymer generally has a particle size of less than 1000 μm, typically from about 150 μm to about 850 μm, with greater than 85% of the particles between 150 μm and 600 μm. Additionally, it has a particle size with the majority of particles by weight with a particle size between about 300 μm to about 600 μm, preferably at least about 60 wt % of the particles having a particle size from about 300 μm to about 600 μm, or at least about 70 wt % of the particles having a particle size from about 300 μm to about 600 μm, or at least about 80 wt % of the particles having a particle size from about 300 μm to about 600 μm as measured by screening through a U.S. standard 30 mesh screen and retained on a U.S. standard 50 mesh screen.

The particulate absorbent polymer made by a process of the present invention may have an Absorbency Under Load at 0.9 psi (AUL(0.9)) of from about 5 g/g to about 26 g/g, or from about 10 g/g to about 22 g/g. The FSR of the particulate absorbent polymer made by the process of the present invention ranges from about 0.2 g/g/sec to about 0.7 g/g/sec.

The (particulate) absorbent polymer according to the present invention can be employed in many absorbent articles including shoe sole inserts, absorbent pads, sanitary towels, diapers, or wound coverings, and they have the property that they rapidly absorb large amounts of sweat, menstrual blood, urine, or other body fluids. Since the agents according to the invention retain the absorbed liquids even under pressure and are also capable of distributing further liquid within the construction in the swollen state, they are capable of being employed in higher concentrations, with respect to the a hydrophilic fiber material, such as cellulose. They are also suitable for use as a homogeneous absorber layer without cellulose fibers in an absorbent construction, as a result of which particularly thin articles are possible. The polymers are furthermore suitable for use in hygiene articles (e.g., incontinence products) for adults.

The polymers according to the invention are also employed in absorbent articles that are suitable for further uses. In particular, the polymers of this invention can be used in absorbent compositions for absorbents for water or aqueous liquids, preferably in constructions for absorption of body fluids, in foamed sheet-like structures, in packaging materials, in constructions for plant growing, as soil improvement agents or as active compound carriers. For this, they are processed to a web by mixing with paper or fluff or synthetic fibers or by distributing the absorbent polymers between substrates of paper, fluff or non-woven textiles or by processing into carrier materials.

Test Procedures

For purposes of this invention, the Young's modulus may be determined by either the Zwick or Anton Paar methods as follows.

Compression Test Method Zwick for Determining Young's Modulus

A Zwick Tester Zwicki 1120 with a flat 4.8 cm diameter plunger is used to compress the absorbent polymer sample using an A.S.T. GmbH load cell type KAP-S. A sample of the polymer sheet after polymerization with a minimum diameter of 6 cm is placed on a flat and horizontal sample holder, centered below the plunger. A pre-load of 0.5N and a pre-load speed of 200 mm/min is used to identify the sample interface. After the plunger contacts the sample surface, the pressure displacement data is recorded by the connected software testXpert V3.31. The force is increased to about 79N and a travel speed of 8 mm/min is selected. The sample thickness is determined with a caliper and should be between 1 mm to 20 mm.

The Young's modulus is determined by following the equation:

$$E=F*L_0/(A_0*\Delta L)$$

E is the Young's modulus (modulus of elasticity)
F is the force exerted on polymer sheet;
$A_0$ is the actual cross-sectional area through which the force is applied;
$\Delta L$ is the amount by which the thickness of the object changes; and
$L_0$ is the original thickness of the polymer sheet Compression Test Method Anton Paar for Determining Young's Modulus An Anton Paar rheometer MCR 302 controlled with Rheoplus V3.62 software is used to determine Young's modulus. A PP50 plate geometry with a diameter of 5 cm is used. A sample of the polymer sheet after polymerization with a minimum diameter of 6 cm is placed on a flat and horizontal sample holder, centered below the plate. The plate is lowered with a speed of 4 mm/min and the normal force, distance and time are recorded with the Rheoplus software. A value of 0.01/s is entered for d/d lift_speed/gap in the Rheoplus software and the test starts at a gap of 3 mm above the sample. 500 is entered for the measurement points and 0.25 s is selected as measurement duration per point. The Young's modulus is calculated by the displacement between an applied normal force of 0.3N to 50N. The sample thickness is determined with a caliper and should be between 1 mm to 20 mm.

The Young's modulus is determined by the following equation:

$$E=F*L_0/(A_0*\Delta L)$$

E is the Young's modulus (modulus of elasticity)
F is the force exerted on the polymer sheet;
$A_0$ is the actual cross-sectional area through which the force is applied;
$\Delta L$ is the amount by which the thickness of the object changes; and
$L_0$ is the original thickness of the polymer sheet Microscopic Imaging Microscopic imaging is used to determine the pore size and distribution in a polymer, Gel samples are taken from the polymer sheet for microscopy. A piece of the approximate size of 8 cm×8 cm×2 cm is dehydrated in ethanol over two days. The sample is then removed from the ethanol and cut in thin slices of around 25 μm with a Leica RM 3335 microtome. If the samples are too brittle or soft, their moisture content needs to be slightly adjusted by addition of moisture or additional dehydration in ethanol until a smooth cutting is obtained. A camera equipped Leica DM 2500 M microscope is used for imaging the thin cross sections using a 5× objective lens.

Average Pore Diameter

Average pore diameters were determined from cross-sectional images of the dehydrated polymeric foam obtained according to the Microscopic Imaging method using Image-Pro Insight ver. 8.0.3 software by Media Cybernetics. Pores that were interconnected were not analyzed. Average pore diameter was used to characterize the polymeric foams.

Vortex Test

The Vortex Test measures the amount of time in seconds required for 2 grams of a (particulate) absorbent polymer to close a vortex created by stiffing 50 milliliters of 0.9 wt % saline solution at 600 revolutions per minute on a magnetic stir plate. The time it takes for the vortex to close is an indication of the free swell absorption rate of the (particulate) absorbent polymer.

Equipment and Materials

1. Schott Duran 100 ml beaker and 50 ml graduated cylinder.
2. Programmable magnetic stir plate, capable of providing 600 revolutions per minute (such as that commercially available from PMC Industries, under the trade designation Dataplate® Model #721).
3. Magnetic stir bar without rings, 7.9 millimeters×32 millimeters, Teflon® covered (such as that commercially available from Baxter Diagnostics, under the trade designation S/PRIM brand single pack round stiffing bars with removable pivot ring).
4. Stopwatch
5. Balance, accurate to +/−0.01 g
6. Saline solution (0.9 wt % NaCl in distilled water) at 23° C. (degrees Celsius)
7. Weighing paper
8. Room with standard condition atmosphere: Temp=23° C.+/−1° C. and relative humidity=50%+/−2%.

Test Procedure

1. Measure 50 ml+/−0.01 ml of saline solution into the 100 ml beaker.
2. Place the magnetic stir bar into the beaker.
3. Program the magnetic stir plate to 600 revolutions per minute.

4. Place the beaker on the center of the magnetic stir plate such that the magnetic stir bar is activated. The bottom of the vortex should be near the top of the stir bar.
5. Weigh out 2 g+/−0.01 g of the (particulate) absorbent polymer to be tested on weighing paper.
NOTE: The absorbent polymer is tested in particulate form. No screening to a specific particle size is performed.
6. While the saline solution is being stirred, quickly pour the (particulate) absorbent polymer to be tested into the saline solution and start the stopwatch. The (particulate) absorbent polymer to be tested should be added to the saline solution between the center of the vortex and the side of the beaker.
7. Stop the stopwatch when the vortex disappears and the surface of the saline solution becomes flat, and record the time.
8. The time, recorded in seconds, is reported as the Vortex Time.

Free Swell Rate (FSR)

This method serves to determine the swell rate of the water-swellable materials herein in an aqueous 0.9% saline solution, without stiffing or confining pressure. The amount of time taken to absorb a certain amount of liquid is recorded and this is reported in gram of liquid (0.9% saline solution) absorbed per gram of water-swellable material per second, e.g., g/g/sec.

The sample material (1.0 g+/−0.001 g) is weighed and placed evenly over the bottom of a 25 ml beaker. A 20.0 g aliquot of the saline solution (also at 23° C.) is promptly poured into the beaker. A timer is started immediately after the saline solution is delivered and stopped when the final portion of the saline solution is absorbed by the water-swellable material. This is readily indicated by the loss of light reflection from the bulk saline surface, particularly at the interface with the beaker walls. The elapsed time, $t_s$, in seconds is recorded. The free-swell rate, in g liquid/g sample material/sec, is calculated as: FSR=20 g/g/$t_s$. The test is run in triplicate, and the average is used for the free-swell rate of the sample material.

Centrifuge Retention Capacity Test (CRC)

The CRC Test measures the ability of the particulate absorbent polymer composition to retain liquid therein after being saturated and subjected to centrifugation under controlled conditions. The resultant retention capacity is stated as grams of liquid retained per gram weight of the sample, (g/g). For particulate absorbent polymer, the sample to be tested is prepared from particles that are pre-screened through a U.S. standard 30 mesh screen and retained on a U.S. standard 50 mesh screen. As a result, the particulate absorbent polymer composition sample comprises particles sized in the range of about 300 microns to about 600 microns. The particles can be pre-screened by hand or automatically. If particles are not used, then a rectangle is cut from a ~2 mm thick sheet of the foamed polymer that achieves the starting target weight.

The retention capacity is measured by placing about 0.16 grams to 0.20 grams of the pre-screened particulate absorbent polymer sample or rectangle of 2 mm thick polymer sheet into a water-permeable tea bag that will contain the sample while allowing a test solution (0.9 weight percent sodium chloride in distilled water) to be freely absorbed by the sample. A heat-sealable tea bag material, such as that available from Dexter Corporation (having a place of business in Windsor Locks, Conn., U.S.A.) as model designation 1234T heat sealable filter paper. The bag is formed by folding a 5 inch×3 inch sample of the bag material in half and heat-sealing two of the open edges to form a 2.5 inch×3 inch rectangular pouch. The heat seals are about 0.25 inches inside the edge of the material. After the sample is placed in the pouch, the remaining open edge of the pouch is also heat-sealed. Empty bags are also made to serve as controls. Three samples are prepared for each absorbent polymer to be tested.

The sealed bags are submerged in a pan containing the test solution at about 23° C., making sure that the bags are held down until they are completely wetted. After wetting, the absorbent polymer samples remain in the solution for 30 minutes, at which time they are removed from the solution and temporarily laid on a non-absorbent flat surface.

The wet bags are then placed into a centrifuge basket wherein the wet bags are separated from each other and are placed at the outer circumferential edge of the basket, wherein the basket is of a suitable centrifuge capable of subjecting the samples to a g-force of about 295 g. One suitable centrifuge is a CLAY ADAMS DYNAC II, Model #0103, having a water collection trough, a digital rpm gauge, and a machined drainage basket adapted to hold and drain the flat bag samples. Where multiple samples are centrifuged, the samples are placed in opposing positions within the centrifuge to balance the basket when spinning. The bags (including the wet, empty bags) are centrifuged at about 1,600 rpm (e.g., to achieve a target g-force of about 295 g force for 3 minutes. G force is defined as a unit of inertial force on a body that is subjected to rapid acceleration or gravity, equal to 32 ft/sec² at sea level. The bags are removed and weighed, with the empty bags (controls) being weighed first, followed by the bags containing the absorbent polymer samples. The amount of solution retained by the absorbent polymer sample, taking into account the solution retained by the bag itself, is the centrifuge retention capacity (CRC) of the absorbent polymer, expressed as grams of fluid per gram of absorbent polymer. More particularly, the retention capacity is determined by the following equation:

CRC=[sample bag after centrifuge−empty bag after centrifuge−dry sample weight]/dry sample weight The three samples are tested, and the results are averaged to determine the CRC of the absorbent polymer.

Absorbency Under Load Test (AUL(0.9 Psi))

The Absorbency Under Load (AUL) Test measures the ability of the absorbent polymer to absorb a 0.9 weight percent solution of sodium chloride in distilled water at 23° C. (test solution) while the material is under a 0.9 psi load. The apparatus for testing AUL consists of 1. An AUL assembly including a 1 inch inner diameter cylinder, a 4.4 g piston, and a standard 317 g weight. The components of this assembly are described in additional detail below.
2. A series of plastic petri dishes that are 14 cm in diameter by 2.2 cm deep
3. A 9 cm diameter sintered glass frit with a 'C' porosity (25-50 microns). This frit is prepared in advance through equilibration in saline (0.9% sodium chloride in distilled water, by weight). In addition to being washed with at least two portions of fresh saline, the frit must be immersed in saline for at least 12 hours prior to AUL measurements.
4. Whatman Grade 1, 9 cm diameter filter paper circles.
5. A supply of saline (0.9% sodium chloride in distilled water, by weight).

The cylinder of the AUL assembly used to contain the absorbent polymer is made from one-inch (2.54 cm) inside diameter thermoplastic tubing machined-out slightly to be sure of concentricity. After machining, a 400 mesh stainless steel wire cloth is attached to the bottom of the cylinder by heating the steel wire cloth in a flame until red hot, after which the cylinder is held onto the steel wire cloth until cooled. A soldering iron can be utilized to touch up the seal if unsuccessful or if it breaks. Care must be taken to maintain a flat smooth bottom and not distort the inside of the cylinder.

The 4.4 g piston is made from one-inch diameter solid material (e.g., PLEXIGLAS®) and is machined to closely fit without binding in the cylinder.

A standard 317 g weight is used to provide a 62,053 dyne/cm$^2$ (about 0.9 psi) restraining load. The weight is a cylindrical, ~1 inch (2.5 cm) diameter, stainless steel weight that is machined to closely fit without binding in the cylinder.

Unless specified otherwise, a sample corresponding to a layer of at least about 300 gsm. (0.16 g±0.005 g) of absorbent polymer is utilized for testing the AUL. The sample is taken from absorbent polymer that are pre-screened through U.S. standard 30 mesh and retained on U.S. standard 50 mesh. The absorbent polymer can be pre-screened with, for example, a RO-TAP® Mechanical Sieve Shaker Model B available from W. S. Tyler, Inc., Mentor Ohio. Sieving is conducted for about 10 minutes. If AUL of a polymer sheet is to be determined, a 1 inch diameter plug is cut from the sheet and trimmed in thickness to arrive at a weight of 0.16 g±0.005 g.

The inside of the cylinder is wiped with an antistatic cloth prior to placing the absorbent polymer into the cylinder.

The desired amount of the absorbent polymer (about 0.16 g) is weighed and evenly distributed on the wire cloth at the bottom of the cylinder. The weight of the absorbent polymer in the bottom of the cylinder is recorded as 'SA,' for use in the AUL calculation described below. After carefully placing the 4.4 g piston and 317 g weight on top of the absorbent polymer in the cylinder, the AUL assembly including the cylinder, piston, weight, and absorbent polymer is weighed, and the weight is recorded as weight 'A'.

A sintered glass frit (described above) is placed in the plastic petri dish, with saline added to a level equal to that of the upper surface of the glass frit. A single circle of filter paper is placed gently on the glass fit, and the AUL assembly containing the absorbent polymer is then placed on top of the filter paper. The AUL assembly is then allowed to remain on top of the filter paper for a test period of one hour, with attention paid to keeping the saline level in the tray constant. At the end of the one hour test period, the AUL apparatus is then removed from the frit and weighed, with this value recorded as weight 'B.'

The AUL(0.9 psi) is calculated as follows:

$$AUL(0.9\ psi) = (B-A)/SA$$

wherein

A=Weight of AUL Unit with starting absorbent polymer

B=Weight of AUL Unit with absorbent polymer after 60 minutes absorption

SA=starting absorbent polymer weight

A minimum of two tests are performed and the results are averaged to determine the AUL value under 0.9 psi load. The absorbent polymer samples are tested at about 23° C. and about 50% relative humidity.

EXAMPLES

The following examples and comparative examples are provided to illustrate the inventions of processes to make (foamed) polymeric sheets, polymers and absorbent polymers and particulate absorbent polymers as set forth in the claims, and do not limit the scope of the claims.

Example 1

Preparation of a Stock Monomer Solution A.

Into a polyethylene vessel equipped with an agitator and a cooling coil, 1.21 kg aqueous 50 wt % NaOH solution and 1.81 kg of distilled water were added and cooled to 20° C. 0.516 kg of glacial acrylic acid was then added to the caustic solution and the solution was again cooled to 20° C. 4.11 g of polyethylene glycol monoallylether acrylate, 4.11 g of ethoxylated trimethylol propane triacrylate (TMPTA 15EO), and 1.03 kg of glacial acrylic acid were mixed and added to the first solution, followed by cooling to 4-6° C.

Comparative Example 1-1

Nitrogen was bubbled through 119 g of Stock Monomer Solution A for 5 minutes to remove dissolved oxygen. 6.25 g of water was added. Under agitation, 1.25 g of a 1 wt % aqueous $H_2O_2$ solution, 1.88 g of a 2 wt % aqueous sodium persulfate solution, and 1.13 g of a 0.5 wt % aqueous sodium erythorbate solution were added into the monomer solution to initiate the polymerization reaction. The agitator was stopped after 5 s and the initiated monomer was poured into a round container with a diameter of about 15.5 cm and polymerized for 25 minutes. The thickness of the resulting polymer gel sheet was 4 mm to 5 mm

Comparative Example 1-2

Nitrogen was bubbled through 119 g of Stock Monomer Solution A for 5 minutes. Under agitation 6.25 g of a 2.95 wt % sodium bicarbonate aqueous solution was added to the monomer. Under agitation, 1.25 g of a 1 wt % aqueous $H_2O_2$ solution, 1.88 g of a 2 wt % aqueous sodium persulfate solution, and 1.13 g of a 0.5 wt % aqueous sodium erythorbate solution were added into the monomer solution to initiate the polymerization reaction. The agitator was stopped after 5 s and the initiated monomer was poured into a round container with a diameter of about 15.5 cm and polymerized for 25 minutes. The thickness of the resulting polymer gel sheet was 4 mm to 5 mm.

Example 1-3

Nitrogen was bubbled through 119 g of Stock Monomer Solution A for 5 minutes. Under agitation 6.25 g of a 2.95 wt % sodium bicarbonate aqueous solution was added to the monomer. Then, the monomer solution was treated with a Hielscher UIP500 ultrasonic processor at an amplitude of 33% while stiffing on a magnetic stir plate. A 34 mm diameter ultrasonic probe was used and the tip submersed into the solution by about 1 cm to 2 cm. The treatment was performed for 4 s.

After stopping the ultrasonic treatment and under agitation, 1.25 g of a 1 wt % aqueous $H_2O_2$ solution, 1.88 g of a 2 wt % aqueous sodium persulfate solution, and 1.13 g of a 0.5 wt % aqueous sodium erythorbate solution were added into the monomer solution to initiate the polymerization reaction. The agitator was stopped after 5 s and the initiated monomer was poured into a round container with a diameter of about 15.5 cm and polymerized for 25 minutes. The thickness of the resulting polymer gel sheet was 4 mm to 5 mm.

FIG. 1 is a comparison of the (foamed) polymer structures of Comparative Example 1-1, Comparative Example 1-2 and Example 1-3 using microscopic imaging according to the method described herein. The spherical like objects are pores in the polymer structure. FIG. 1A (Comparative Ex 1-1) shows the polymer produced from monomer without blowing agent and without ultrasonic treatment. A porous structure is not evident. FIG. 1B (Comparative Example 1-2) shows polymer produced from monomer with blowing agent but without ultrasonic treatment. A porous structure with a few larger diameter pores is produced. FIG. 1C (Example 1-3) shows polymer produced from monomer with a blowing agent and ultrasonic treatment. It can be clearly seen that the ultrasonic treatment produced a foam with many more smaller diameter pores, of more uniform size, distributed homogeneously throughout the polymer.

Comparative Example 1-4

110 g of Stock Monomer Solution A combined with 8.62 g polyethylene glycol 200 (PEG) and mixed. Nitrogen was bubbled through the monomer solution for 5 minutes. 6.25 g of water was added. Under agitation, 1.25 g of a 1 wt % aqueous $H_2O_2$ solution, 1.88 g of a 2 wt % aqueous sodium persulfate solution, and 1.13 g of a 0.5 wt % aqueous sodium erythorbate solution were added into the monomer solution to initiate the polymerization reaction. The agitator was stopped after 5 s, and the initiated monomer was poured into a round container with a diameter of about 15.5 cm and polymerized for 25 minutes. The thickness of the resulting polymer gel sheet was 4 mm to 5 mm.

Comparative Example 1-5

110 g of Stock Monomer Solution A was added to 8.62 g polyethylene glycol 200 (PEG) and mixed. Nitrogen was bubbled through the monomer solution for 5 minutes. Then, under agitation, 6.25 g of a 2.95 wt % sodium bicarbonate aqueous solution was added to the monomer.

Under agitation, 1.25 g of a 1 wt % aqueous $H_2O_2$ solution, 1.88 g of a 2 wt % aqueous sodium persulfate solution, and 1.13 g of a 0.5 wt % aqueous sodium erythorbate solution were added into the monomer solution to initiate the polymerization reaction. The agitator was stopped after 5 s, and the initiated monomer was poured into a round container with a diameter of about 15.5 cm and polymerized for 25 minutes. The thickness of the resulting polymer gel sheet was 4 mm to 5 mm.

Example 1-6

110 g of Stock Monomer Solution A was combined with 8.62 g polyethylene glycol 200 (PEG) and mixed. Nitrogen was bubbled through the monomer solution for 5 minutes. Under agitation, 6.25 g of a 2.95 wt % sodium bicarbonate aqueous solution were added to the monomer.

The monomer solution was treated with a Hielscher UIP500 ultrasonic processor at an amplitude of 33% while stirring on a magnetic stir plate. A 34 mm diameter probe was used, and the tip submersed into the solution by about 1 cm to 2 cm. The treatment was performed for 4 s.

After stopping the ultrasonic treatment and under agitation, 1.25 g of a 1 wt % aqueous $H_2O_2$ solution, 1.88 g of a 2 wt % aqueous sodium persulfate solution, and 1.13 g of a 0.5 wt % aqueous sodium erythorbate solution were added into the monomer solution to initiate the polymerization reaction. The agitator was stopped after 5 s, and the initiated monomer was poured into a round container with a diameter of 15.5 cm and polymerized for 25 minutes. The thickness of the resulting polymer gel sheet was 4 mm to 5 mm.

The compression test with the Zwick was used to determine the Young's modulus for the polymer sheets after polymerization for Examples 1-1 to 1-6.

Samples for CRC measurements were prepared for Example 1-1 to 1-6 in the following manner: About 50 g gel was dried in a lab oven for 4 days at 40° C. plus one more day at 60° C. Then the materials were crushed into small particles by a pestle and mortar. The samples were pre-screened through a U.S. standard 30-mesh screen and retained on a U.S. standard 50-mesh screen. As a result, the particulate absorbent polymer samples comprised particles sized in the range of about 300 microns to about 600 microns.

Table 1 shows the description, gel sheet thickness after polymerization, CRC and Young's modulus for Comparative Examples 1-1, 1-2, 1-4 and 1-5, as well as inventive Examples 1-3 and 1-6. The effect of the ultrasonic treatment on the Young's modulus can be seen. A foamed polymer produced by the addition of a blowing agent has a greater compressibility (lower Young's modulus) than one without foaming (no blowing agent). But the addition of the ultrasonic treatment (and blowing agent) significantly further increases the compressibility, resulting in a better shock absorbing polymer, while maintaining excellent absorption. This is true with and without the presence of the plasticizer PEG.

TABLE 1

| Example | Description | Thickness of the gel sheet (mm) | CRC (g/g) | Young's modulus (kPa)-Zwick | Percent reduction in Young's modulus by addition of ultrasound |
|---|---|---|---|---|---|
| Comparative Ex 1-1 | No blowing agent | 4.1 | 22.7 | 271 | |
| Comparative Ex 1-2 | blowing agent $NaHCO_3$ | 4.3 | 22.3 | 180 | |
| Ex 1-3 | blowing agent $NaHCO_3$ & ultrasound | 4.4 | 24.8 | 88.5 | −51% |
| Comparative Ex 1-4 | No blowing agent; PEG | 4.1 | 25.1 | 107 | |
| Comparative Ex 1-5 | blowing agent $NaHCO_3$; PEG | 4.9 | 24 | 97.6 | |
| Ex 1-6 | blowing agent $NaHCO_3$; PEG & ultrasound | 5.1 | 23.7 | 83.1 | −15% |

Example 2

Preparation of a Stock Monomer Solution B.

Into a polyethylene vessel equipped with an agitator and a cooling coil, 1.21 kg aqueous 50 wt % NaOH solution and 1.81 kg of distilled water were added and cooled to 20° C. 0.516 kg of glacial acrylic acid was then added to the caustic solution and the solution was again cooled to 20° C. 4.11 g of polyethylene glycol monoallylether acrylate, 4.11 g of ethoxylated trimethylol propane triacrylate (TMPTA15EO), and 1.03 kg of glacial acrylic acid were mixed and added to the first solution, followed by cooling to 4-6° C.

Comparative Example 2-1

Nitrogen was bubbled through the Stock Monomer Solution B for 5 minutes. Then, 1.05 kg monomer solution was poured in a 1 L SodaStream bottle. Nitrogen was sparged through the monomer in the bottle for 10 s. The bottle was attached to a SodaStream Fountain Jet from SodaStream USA with a 60 L compressed $CO_2$ cylinder. The $CO_2$ release button was pushed twice for one second each to release $CO_2$ in the attached SodaStream bottle. The pressure was slowly released by tilting the bottle slightly out of the support and the bottle then detached. Then, 70 g carbonated monomer solution from the SodaStream bottle was combined with 55 g monomer solution from the stock monomer solution B in a 300 ml cup.

Under agitation 1.25 g of a 1 wt % aqueous $H_2O_2$ solution, 1.88 g of a 2 wt % aqueous sodium persulfate solution, and 1.13 g of a 0.5 wt % aqueous sodium erythorbate solution were added into the monomer solution to initiate the polymerization reaction. The agitator was stopped after 5 s and the initiated monomer was poured into a round container with a diameter of about 15.5 cm and polymerized for 25 minutes. The thickness of the resulting polymer gel sheet was 4 mm to 5 mm.

Example 2-2

Nitrogen was bubbled in the Stock Monomer Solution B for 5 minutes. Then, 1.05 kg monomer solution was poured in a 1 L SodaStream bottle. Nitrogen was sparged through the monomer in the bottle for 10 s. The bottle was attached to a SodaStream Fountain Jet available from SodaStream USA with a 60 L compressed $CO_2$ cylinder. The $CO_2$ release button was pushed twice for one second each to release the $CO_2$ in the attached SodaStream bottle. The pressure was slowly released by tilting the bottle slightly out of the support and the bottle was then detached. 70 g carbonated monomer solution from the SodaStream bottle was combined with 55 g monomer solution from the stock monomer solution B in a 300 ml cup.

The monomer solution in the cup was treated with a Hielscher UIP500 ultrasonic processor at an amplitude of 33% while stirring on a magnetic stir plate. A 34 mm diameter probe was used and the tip submersed into the solution about 1 cm to 2 cm. The treatment was performed for 4 s.

After stopping the ultrasound treatment and under agitation, 1.25 g of a 1 wt % aqueous $H_2O_2$ solution, 1.88 g of a 2 wt % aqueous sodium persulfate solution, and 1.13 g of a 0.5 wt % aqueous sodium erythorbate solution were added into the monomer solution to initiate the polymerization reaction. The agitator was stopped after 5 s, and the initiated monomer was poured into a round container with a diameter of about 15.5 cm and polymerized for 25 minutes. The thickness of the resulting polymer gel sheet was 4 mm to 5 mm.

Figure 2B:
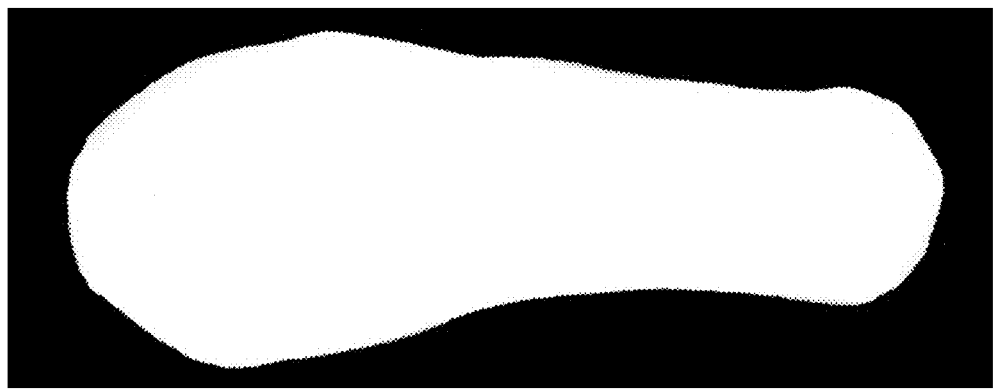
FIG. 2B shows a microscopic image of a polymeric foam shoe insole produced from monomer with carbon dioxide as the blowing agent and an ultrasonic treatment according to the invention.
Figure 2A:
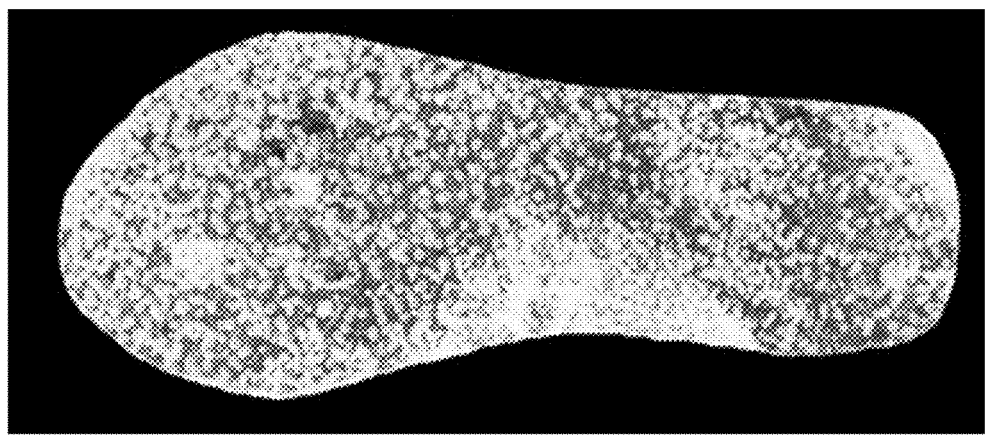
FIG. 2A shows a microscopic image of a polymeric foam shoe insole produced from monomer with carbon dioxide as the blowing agent but without ultrasonic treatment.

FIG. 2 shows shoe sole inserts cut out of the (foamed) polymer sheets. FIG. 2A (Comparative Example 2-1) is the polymeric foam shoe insole produced with $CO_2$ as blowing agent but without an ultrasonic treatment. The final polymeric foam is made up of a clear gel containing widely spaced, inhomogeneously distributed, relatively large pores that are individually visible to the naked eye. FIG. 2B (Example 2-2) shows a polymeric foam shoe insole produced with the same amount of $CO_2$ as blowing agent and an ultrasonic treatment. The addition of the ultrasonic treatment has produced a polymeric foam with such a high density of homogeneously distributed microscopic pores that the polymer appears opaque white. The individual pores are too small to be seen with the naked eye.

Figure 3B:
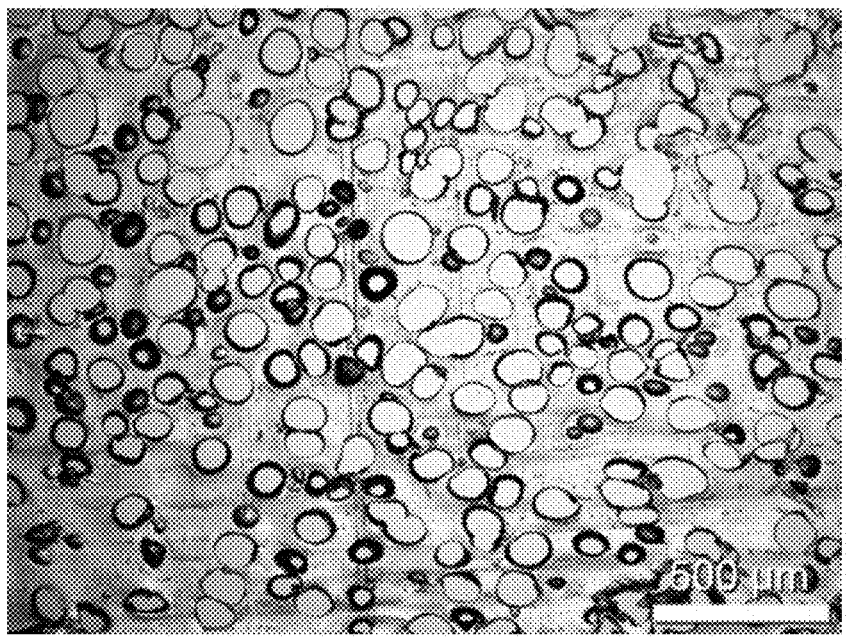
FIG. 3B shows a microscopic image of a polymeric foam structure produced from monomers with carbon dioxide as the blowing agent and with ultrasound treatment according to the invention.
Figure 3A:
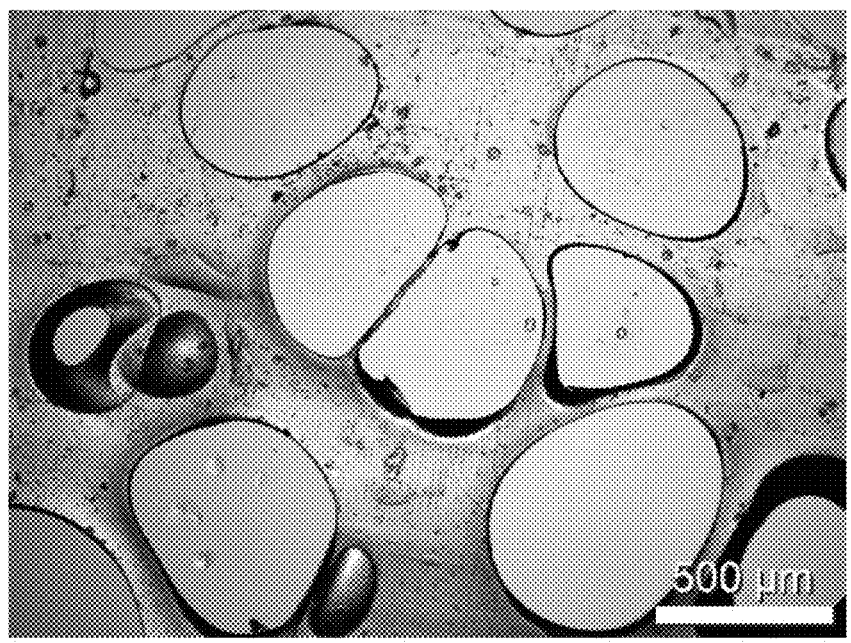
FIG. 3A shows a microscopic image of a polymeric foam structure produced from monomers with carbon dioxide as the blowing agent but without ultrasound treatment.

The polymeric foam structure of Comparative Example 2-1 was compared to Example 2-2 using microscopic imaging and images are shown in FIG. 3. The spherical-like objects are from pores in the polymer structure. FIG. 3A (Comparative Example 2-1) shows that polymeric foam produced by using $CO_2$ as the blowing agent in the monomer but without ultrasonic treatment contains inhomogenously distributed, large pores of non-uniform size. FIG. 3B (Example 2-2) shows polymeric foam made from monomer containing the same amount of $CO_2$ as the blowing agent but treated with ultrasound contained a much higher number of smaller diameter, homogeneously distributed pores.

The compression test with the Zwick analyzer was used to determine the Young's modulus for the polymer sheets of Comparative Example 2-1 and Example 2-2.

Samples for CRC measurements were prepared for Comparative Example 2-1 and Example 2-2 in the following manner: 15 g gel of each sample was cut into small pieces and the cut gel was placed in a Petri dish with a diameter of 10 cm and dried in a lab oven at 100° C. for 2 days. Then the sample was crushed into small particles by a pestle and mortar. The samples were pre-screened through a U.S. standard 30-mesh screen and retained on a U.S. standard 50-mesh screen. As a result, the particulate polymer composition samples comprises particles sized in the range of about 300 microns to about 600 microns.

TABLE 2

Properties of Comparative Example 2-1 and Example 2-2.

| Example | Description | Thickness of the gel sheet (mm) | CRC (g/g) | Young's modulus (kPa)-Zwick | Percent reduction in Young's modulus by addition of ultrasound |
|---|---|---|---|---|---|
| Comparative Ex 2-1 | blowing agent $CO_2$ | 4.1 | 26.2 | 205 | |
| Ex 2-2 | blowing agent $CO_2$ & ultrasound | 4.6 | 26.9 | 104 | −49% |

Table 2 again clearly shows that the use of ultrasound with a blowing agent produces foamed polymer with an advantageous lower Young's modulus and higher compressibility, while maintaining excellent absorption properties.

Example 3

Preparation of a Stock Monomer Solution C.

Into a polyethylene vessel equipped with an agitator and a cooling coil, 1.21 kg of aqueous 50 wt % NaOH solution and 1.784 kg of distilled water were added and cooled to 20° C. 0.516 kg of glacial acrylic acid was then added to the caustic solution and the solution again cooled to 20° C. 13.0 g of methylene bisacrylamide and 1.03 kg of glacial acrylic acid were mixed and added to the first solution, followed by cooling to 4-6° C.

Comparative Example 3-1

Nitrogen was bubbled through 413 g of Stock Monomer Solution C plus 11.7 g distilled water for 5 minutes. Under agitation, 1.74 g of a 0.5 wt % aqueous sodium anthraquinone-2-sulfonate solution was added, 4.13 g of 1% by weight of $H_2O_2$ aqueous solution, 6.20 g of 2 wt % aqueous sodium persulfate solution and 3.72 g of 0.5 wt % aqueous sodium erythorbate solution was added into the monomer solution. Then, the monomer solution was poured into a small tray, which had dimensions of 23 cm×23 cm×2 cm deep. UV exposure was applied for 35 seconds with a FireFly 75×20AC365 at full power from an approximate distance of 10 cm to evenly expose the monomer and initiate polymerization. 25 minutes was allowed for polymerization. After polymerization the gel polymer sheet had a thickness of 5 mm to 6 mm.

Comparative Example 3-2

Nitrogen was bubbled through 413 g of Stock Monomer Solution C for 5 minutes. Under agitation, 11.7 g of a 2.60 wt % aqueous sodium bicarbonate solution was added to the monomer. Under agitation, 1.74 g of a 0.5 weight percent aqueous sodium anthraquinone-2-sulfonate solution, 4.13 g of 1% by weight of $H_2O_2$ aqueous solution, 6.20 g of 2 wt % aqueous sodium persulfate solution and 3.72 g of 0.5 wt % aqueous sodium erythorbate solution was added into the monomer solution. Then, the monomer solution was poured into a small tray, with dimensions of 23 cm×23 cm×2 cm deep. UV exposure was applied for 35 seconds with a FireFly 75×20AC365 at full power from an approximate distance of 10 cm to evenly expose the monomer and intitiate polymerization. 25 minutes was allowed for polymerization. After polymerization the gel polymer sheet had a thickness of 5 mm to 6 mm.

Example 3-3

Nitrogen was bubbled through 375 g of Stock Monomer Solution C for 5 minutes. 10.6 g of a 2.60 wt % sodium bicarbonate aqueous solution was added to the monomer. Then, the monomer solution was treated with a Hielscher UIP500 ultrasonic processor at an amplitude of 33% while stiffing with a magnetic stir plate. A 34 mm diameter probe was used and the tip submersed into the solution by about 1 cm to 2 cm. The treatment was performed for 4 s.

Under agitation 1.58 g of a 0.5 weight percent aqueous sodium anthraquinone-2-sulfonate solution, 3.75 g of 1% by weight of $H_2O_2$ aqueous solution, 5.63 g of 2 wt % aqueous sodium persulfate solution and 3.38 g of 0.5 wt % aqueous sodium erythorbate solution was added into the monomer solution. Then, the monomer solution was poured into a small tray, which has dimensions of 23 cm×23 cm×2 cm. UV exposure was applied for 35 seconds with a FireFly 75×20AC365 at full power from an approximate distance of 10 cm to evenly expose the monomer and initiate polymerization. 25 minutes was allowed for polymerization. After polymerization the polymer gel sheet had a thickness of 5 mm to 6 mm.

Figure 4C:
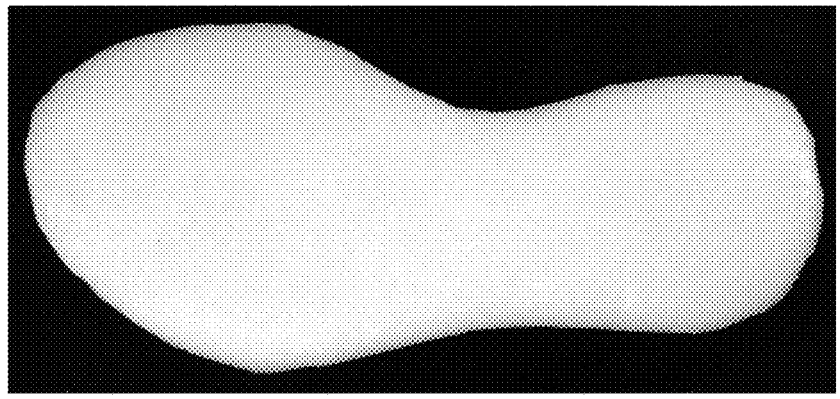
FIG. 4C shows a photographic image of a polymeric foam shoe insole produced from monomers with sodium carbonate and with ultrasonic treatment according to the invention.
Figure 4B:
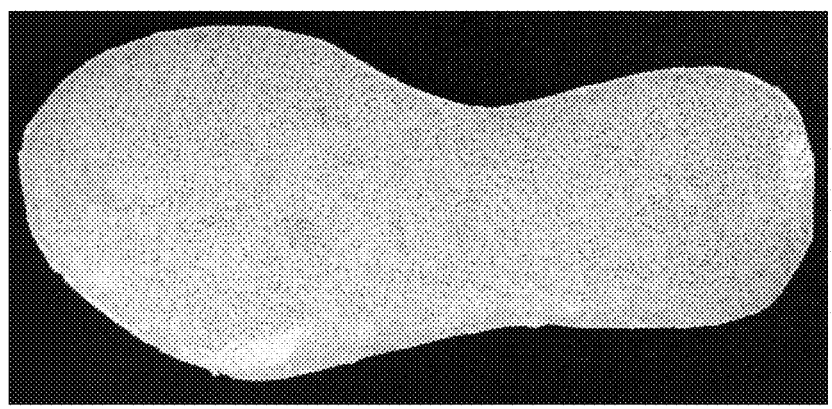
FIG. 4B shows a photographic image of a polymeric foam shoe insole produced from monomers with sodium carbonate but without ultrasonic treatment.
Figure 4A:
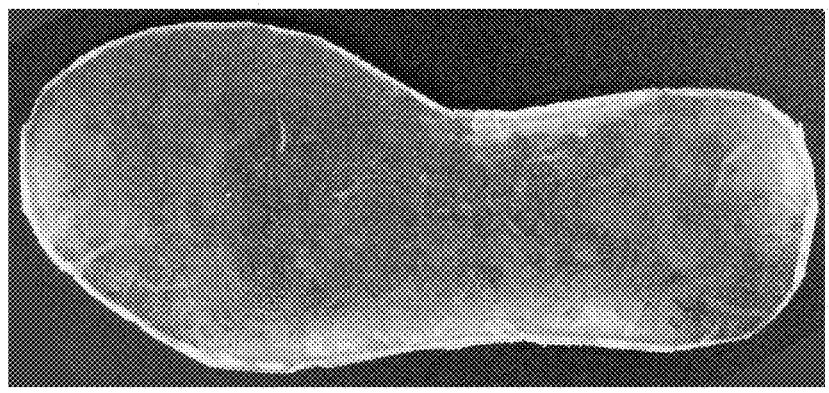
FIG. 4A shows a photographic image of a polymeric foam shoe insole produced from monomers without a blowing agent and without ultrasound treatment.

FIG. 4 shows shoe sole inserts that were cut out of the (foamed) polymer sheets produced in Comparative Examples 3-1 and 3-2 and inventive Example 3-3. FIG. 4A (Comparative Example 3-1) shows the polymeric foam shoe insert produced without sodium bicarbonate blowing agent and without ultrasonic treatment. No porous structure is seen. FIG. 4B (Comparative Example 3-2) shows the polymeric foam shoe insert made using sodium bicarbonate as blowing agent but without ultrasonic treatment. The polymer is clear with relatively large pores distributed throughout. FIG. 4C (Example 3-3) shows the polymeric foam shoe insert made using sodium bicarbonate as blowing agent with an ultrasonic treatment. The polymeric foam contains many more, much finer pores distributed homogeneously throughout so that the shoe insert is completely opaque white.

The compression test with the Anton Paar rheometer was used to determine the Young's modulus for the polymer sheets of Comparative Examples 3-1 and 3-2, as well as Example 3-3.

Samples for CRC measurements were prepared for Example 3-1 to 3-3 in the same manner as for Comparative Example 2-1 and Example 2-2.

Table 3 shows the properties of Comparative Examples 3-1 and 3-2 and Example 3-3. Once again the addition of the ultrasonic treatment dramatically improved the compressibility of the foamed polymer while maintaining excellent absorption.

TABLE 3

| Example | Description | Thickness of the gel sheet (mm) | CRC (g/g) | Young's modulus (kPa) Anton Paar | Percent reduction in Young's modulus by addition of ultrasound |
|---|---|---|---|---|---|
| Comparative Ex 3-1 | no blowing | 5.2 | 18.2 | 407 | |
| Comparative Ex 3-2 | blowing agent NaHCO$_3$ | 5.3 | 18 | 352 | |
| Ex 3-3 | blowing agent NaHCO$_3$ & ultrasound | 5.4 | 19.9 | 108 | −69% |

Comparative Example 4

Into a polyethylene container equipped with an agitator and a cooling coil, 723 g aqueous 50 wt % NaOH solution and 1090 g of distilled water were added, and cooled to 20° C. 310 g of glacial acrylic acid was then added to the caustic solution and the solution was again cooled to 20° C. 1.67 g of polyethylene glycol monoallylether acrylate and 1.67 g of ethoxylated trimethylol propane triacrylate (TMPTA3EO), and 620 g of glacial acrylic acid were mixed and then added to the first solution followed by cooling to 4-6° C.

Nitrogen was bubbled through the monomer solution for 5 minutes. The cooling coil was removed from the container. Under agitation 4.55 g $NaHCO_3$ dissolved in 150 g of distilled water was added to the monomer solution followed by an addition of 30 g of a 1% by weight of $H_2O_2$ aqueous solution, 45 g of a 2 wt % aqueous sodium persulfate solution, and 27 g of a 0.5 wt % aqueous sodium erythorbate solution to initiate the polymerization reaction. The agitator was stopped after 30 s and the initiated monomer was polymerized for 25 minutes.

Example 5

Into a polyethylene container equipped with an agitator and a cooling coil, 723 g aqueous 50 wt % NaOH solution and 1090 g of distilled water were added and cooled to 20° C. 310 g of glacial acrylic acid was then added to the caustic solution and the solution was again cooled to 20° C. 1.67 g of polyethylene glycol monoallylether acrylate and 1.67 g of ethoxylated trimethylol propane triacrylate (TMPTA3EO), and 620 g of glacial acrylic acid were mixed and then added to the first solution followed by cooling to 4-6° C.

Nitrogen was bubbled through the monomer solution for 5 minutes. The cooling coil was removed from the container. Under agitation 3.41 g $NaHCO_3$ dissolved in 150 g distilled water was added to the monomer solution. The monomer solution was treated with a Hielscher UIP500 at an amplitude of 100% while stirring with a magnetic stir plate. A 34 mm diameter ultrasonic probe was used and the tip submersed into the solution by 1 cm to 2 cm. The ultrasonic treatment was performed for 10 s followed by an addition of 30 g of a 1% by weight of $H_2O_2$ aqueous solution, 45 g of a 2 wt % aqueous sodium persulfate solution, and 27 g of a 0.5 wt % aqueous sodium erythorbate solution to initiate the polymerization reaction. The agitator was stopped after 30 s and the initiated monomer was polymerized for 25 minutes.

Figure 5B:
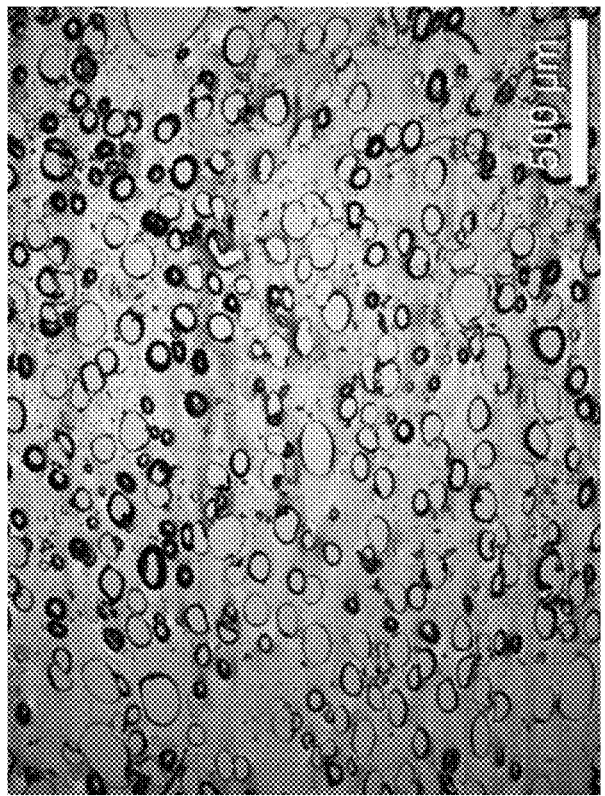
FIG. 5B shows a microscopic image of a polymeric foam structure produced with monomers containing a blowing agent and with ultrasound treatment according to the invention.
Figure 5A:
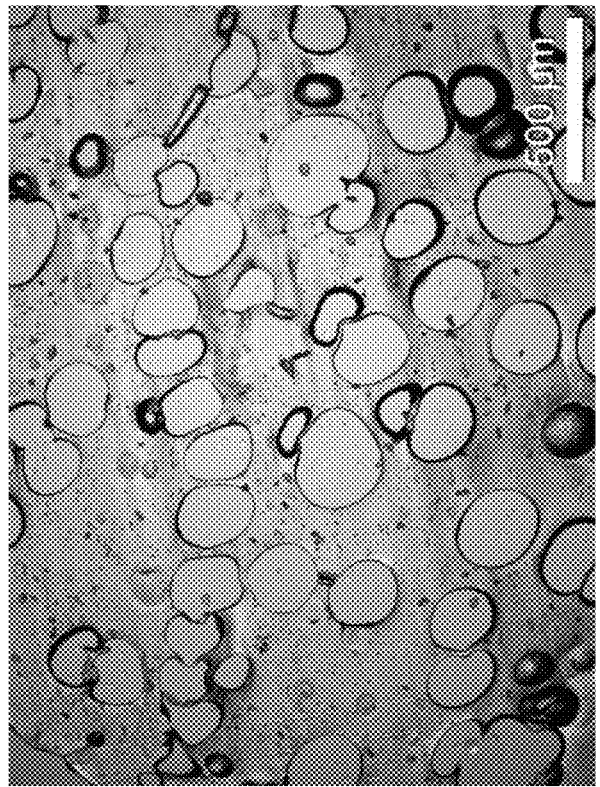
FIG. 5A shows a microscopic image of a polymeric foam structure produced with monomers containing a blowing agent but without ultrasound treatment.

In FIG. 5, the (foamed) polymer structure of Comparative Example 4 is compared to Example 5 using microscopic imaging. FIG. 5A (Comparative Example 4) shows the foamed polymer produced with monomer containing blowing agent without ultrasonic treatment. FIG. 5B (Example 5) shows the foamed polymer produced with monomer containing blowing agent and treated with ultrasound. The monomer solution of both samples contained the same amount of sodium bicarbonate blowing agent. The use of an ultrasonic treatment produced more, finer, more homogeneously distribute pores.

Comparative Examples 4-1 to 4-3 and Example 5-1 to 5-3

The polymer obtained in Comparative Example 4 and Example 5 was further processed as described below.

The foamed hydrogel polymer after polymerization was torn by hand and extruded with a Hobart 4M6 commercial extruder, followed by drying in a Procter & Schwartz Model 062 forced air oven at 175° C. for 12 minutes with up flow and 6 minutes with down flow air on a 20 in×40 in perforated metal tray to a final product moisture level of less than 5 wt %. The dried particulate absorbent polymer was placed in a bucket and crushed with a hammer, milled in a Modern Process Equipment 666-F three-stage roller mill and sieved with a Brinkmann Retsch Shaker to remove absorbent polymer particles greater than 850 μm and smaller than 150 μm.

The product was further sieved to arrive at the following particle size distribution based on U.S. standard test sieves: 15 wt % on mesh 100 (150 μm), 50 wt % on mesh 50 (300 μm), 30% on mesh 35 (500 μm) and 5% on mesh 30 (600 μm).

A CRC and vortex were determined of the particulate absorbent polymers.

200 g samples of the particulate absorbent polymers were each coated with 8 g of an aqueous 25 wt % ethylene carbonate solution using a finely atomized spray while the absorbent polymer particles are fluidized in air. Each coated particulate absorbent polymer sample was placed in a Petri dish of a diameter of 10 cm and then placed in a convection oven at a temperature of 185° C. for 40 and 50 minutes. After the oven time passed the particulate absorbent polymer was cooled and sieved to remove particles greater than 850 μm and smaller than 150 μm.

Table 4 shows how the addition of an ultrasonic treatment has reduced the vortex time (increasing absorption rate), especially after surface crosslinking, while maintaining excellent CRC and AUL.

TABLE 4

| Example | description | Oven time at 185° C.(min) | Vortex (s) | CRC (g/g) | 0.9 AUL (g/g) | Percent reduction in Vortex by addition of ultrasound |
|---|---|---|---|---|---|---|
| Comparative Ex 4-1 | blowing agent | 0, uncoated | 55 | 42.9 | | |
| Comparative Ex 4-2 | $NaHCO_3$ and no | 40 | 70.5 | 32.1 | 25.6 | |
| Comparative Ex 4-3 | ultrasound | 50 | 81 | 30.4 | 24.1 | |
| Ex 5-1 | blowing agent | 0, uncoated | 47 | 41.7 | | −15% |
| Ex 5-2 | $NaHCO_3$ and with | 40 | 62 | 31.9 | 25.9 | −12% |
| Ex 5-3 | ultrasound | 50 | 67 | 30.8 | 25.2 | −17% |

Comparative Example 6

Into a polyethylene container equipped with an agitator and a cooling coil, 723 g aqueous 50 wt % NaOH solution and 1090 g of distilled water were added and cooled to 20° C. 310 g of glacial acrylic acid was then added to the caustic solution and the solution was again cooled to 20° C. 3.83 g of polyethylene glycol monoallylether acrylate, 2.23 g of polyethylene glycol 300 diacrylate, and 620 g of glacial acrylic acid were mixed and then added to the first solution followed by cooling to 4-6° C.

Nitrogen was bubbled through the monomer solution for 5 minutes. The cooling coil was removed from the container. Under agitation 3.42 g $NaHCO_3$ dissolved in 50 g distilled water was added followed by an addition of 30 g of a 1% by weight of $H_2O_2$ aqueous solution, 45 g of a 2 wt % aqueous sodium persulfate solution, and 27 g of a 0.5 wt % aqueous sodium erythorbate solution to initiate the polymerization reaction. The agitator was stopped after 30 s and the initiated monomer was polymerized for 25 minutes.

Example 7

Into a polyethylene container equipped with an agitator and a cooling coil, 723 g aqueous 50 wt % NaOH solution and 1090 g of distilled water were added and cooled to 20° C. 310 g of glacial acrylic acid was then added to the caustic solution, and the solution was again cooled to 20° C. 3.83 g of polyethylene glycol monoallylether acrylate, 2.23 g of polyethylene glycol 300 diacrylate, and 620 g of glacial acrylic acid were mixed and then added to the first solution followed by cooling to 4-6° C.

Nitrogen was bubbled through the monomer solution for 5 minutes. The cooling coil was removed from the container. Under agitation 3.42 g $NaHCO_3$ dissolved in 50 g distilled water was added. Then the monomer solution was treated with a Hielscher UIP500 at an amplitude of 100% while stifling with a magnetic stir plate. A 34 mm diameter probe was used and the tip submersed into the solution by 1 cm to 2 cm. The treatment was performed for 10 s followed by an addition of 30 g of a 1% by weight of $H_2O_2$ aqueous solution, 45 g of a 2 wt % aqueous sodium persulfate solution, and 27 g of a 0.5 wt % aqueous sodium erythorbate solution to initiate the polymerization reaction. The agitator was stopped after 30 s and the initiated monomer was polymerized for 25 minutes.

The polymer foam structures of Comparative Example 6 was compared to Example 7 using microscopic imaging and images are displayed in FIG. 6.

Figure 6A:
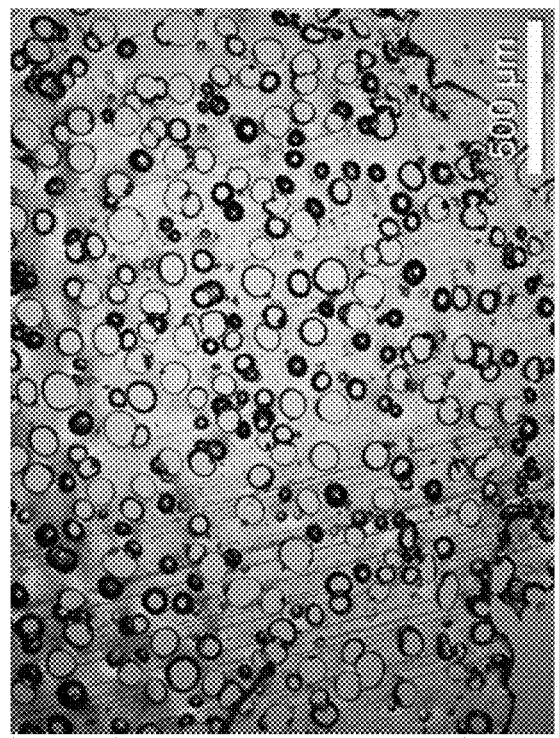
FIG. 6A shows a microscopic image of a polymeric foam structure produced with monomers containing a blowing agent but without ultrasound treatment.
Figure 6B:
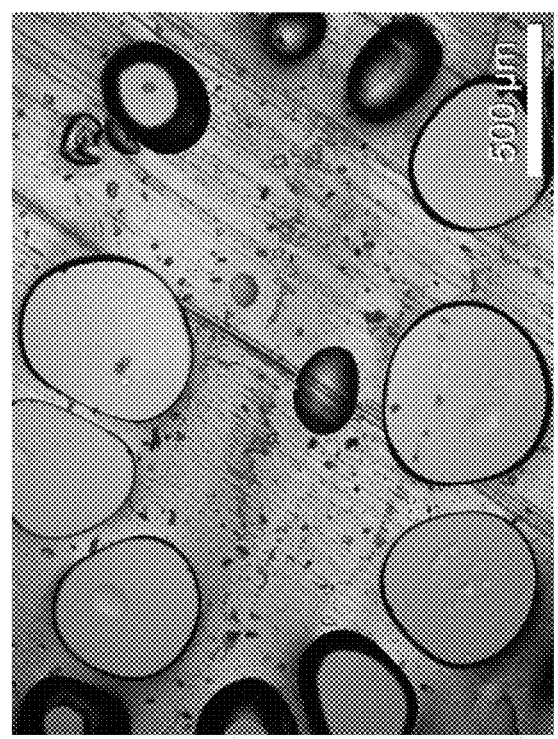
FIG. 6B shows a microscopic image of a polymeric foam structure produced with monomers containing a blowing agent and with ultrasound treatment according to the invention.

FIG. 6A (Example 6) shows the (foamed) polymer structure produced with monomer containing blowing agent and no ultrasonic treatment. FIG. 6B (Example 7) shows the foamed polymer structure produced by monomer with blowing agent and with ultrasound treatment. The monomer solution of both samples contained the same amount of blowing agent. The addition of the ultrasound treatment produced many more, much smaller diameter, homogeneously distributed pores in the absorbent foamed polymer.

The absorbent polymer gel obtained in Comparative Example 6 and Example 7 was further processed as described below.

A particulate absorbent polymer was prepared as follows. The resulting foamed polymer hydrogel after polymerization was torn by hand and extruded with a Hobart 4M6 commercial extruder, followed by drying in a Procter & Schwartz Model 062 forced air oven at 175° C. for 12 minutes with up flow and 6 minutes with down flow air on a 20 in×40 in perforated metal tray to a final product moisture level of less than 5 wt %. The dried particulate absorbent polymer was placed in a bucket and crushed with a hammer, milled in a Modern Process Equipment 666-F three-stage roller mill and sieved with a Brinkmann Retsch Shaker to remove absorbent polymer particles greater than 850 μm and smaller than 150 μm.

The product was sieved to arrive at the following particle size distribution based on U.S. standard test sieves: 15 wt % on mesh 100 (150 μm), 50 wt % on mesh 50 (300 μm), 30% on mesh 35 (500 μm) and 5% on mesh 30 (600 μm).

A CRC and vortex were determined of the uncoated particulate absorbent polymers.

Then, 200 g of each sample of the absorbent particulate polymers were coated with 8 g of an aqueous 25 wt % ethylene carbonate solution using a finely atomized spray while the SAP particles are fluidized in air. Each coated particulate absorbent polymer was contained in a Petri dish of a diameter of 10 cm and then placed in a convection oven of a temperature of 185° C. for 40 minutes. After the oven time passed, the particulate absorbent polymer was cooled and sieved to remove particles greater than 850 μm and smaller than 150 μm.

Example 8 to 10

The absorbent polymer of the present invention may be made in the following way.

Example 8

Into a polyethylene container equipped with an agitator and a cooling coil, 723 g aqueous 50 wt % NaOH solution and 1090 g of distilled water were added and cooled to 20° C. 310 g of glacial acrylic acid was then added to the caustic solution and the solution was again cooled to 20° C. 2.46 g of polyethylene glycol monoallylether acrylate, 2.46 g of ethoxylated trimethylol propane triacrylate (TMPTA15EO), and 620 g of glacial acrylic acid were mixed and then added to the first solution followed by cooling to 4-6° C.

Nitrogen was bubbled through the monomer solution for 5 minutes. The cooling coil was removed from the container. Under agitation 3.98 g $NaHCO_3$ dissolved in 150 g distilled water was added to the monomer solution. Then the monomer solution was treated with a Hielscher UIP500 at an amplitude of 67% while stifling with a magnetic stir plate. A 34 mm diameter ultrasonic probe was used and the tip submersed into the solution by 1 cm to 2 cm. The treatment was performed for 5 s followed by an addition of 30 g of a 1% by weight of $H_2O_2$ aqueous solution, 45 g of a 2 wt % aqueous sodium persulfate solution, and 27 g of a 0.5 wt % aqueous sodium erythorbate solution to initiate the polymerization reaction. The agitator was stopped after 30 s and the initiated monomer was polymerized for 25 minutes.

Example 9

Same as Example 8 except that 5.01 g sodium carbonate was dissolved in 150 g distilled water and added to the monomer solution as blowing agent instead of sodium bicarbonate.

Example 10

Same as Example 9, except that 4.06 g of polyethylene glycol monoallylether acrylate and 2.37 g of polyethylene glycol 300 diacrylate were used as crosslinkers in the monomer.

Figures 7A, 7B, 7C:
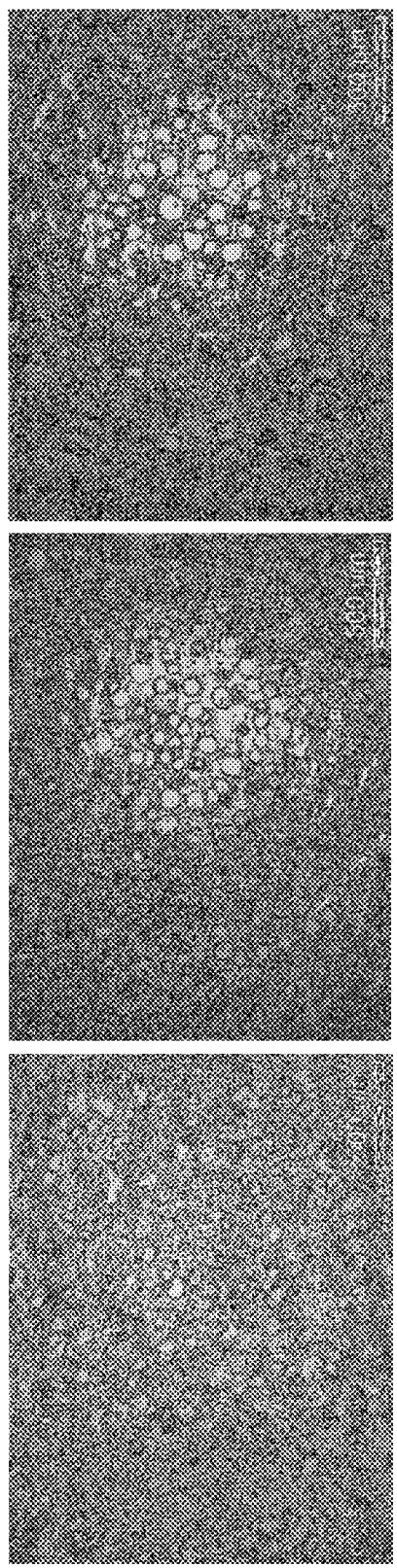
FIG. 7A shows a microscopic image of a polymeric foam structure produced with monomers containing sodium bicarbonate as a blowing agent and with ultrasound treatment according to the invention.
FIG. 7B shows another microscopic image of a polymeric foam structure produced with monomers containing sodium bicarbonate as a blowing agent and with ultrasound treatment according to the invention.
FIG. 7C shows another microscopic image of a polymeric foam structure produced with monomers containing sodium bicarbonate as a blowing agent and with ultrasound treatment according to the invention.

FIGS. 7A, B and C illustrates microscopic imaging of Examples 8, 9 and 10 respectively. All samples show many more pores, of a much smaller diameter, homogeneously distributed compared to Comparative Examples 4 and 6.

The absorbent polymer gel obtained in Examples 8 to 10 after polymerization was further processed as described below.

A particulate polymer was prepared according to the method previously described in Comparative Example 6 and Example 7.

The product was sieved to arrive at the following particle size distribution based on U.S. standard test sieves: 15 wt % on mesh 100 (150 μm), 50 wt % on mesh 50 (300 μm), 30% on mesh 35 (500 μm) and 5% on mesh 30 (600 μm). A CRC and vortex were determined of the uncoated particulate absorbent polymers.

200 g of each example sample were coated with 8 g of an aqueous 25 wt % ethylene carbonate solution using a finely atomized spray while the particles are fluidized in air. The coated particulate polymer was contained in Petri dishes of a diameter of 10 cm and then placed in a convection oven of a temperature of 185° C. for 50 minutes. After the oven time passed the particulate polymer was cooled and sieved to remove particles greater than 850 μm and smaller than 150 μm.

CRC, AUL and vortex were determined of the coated and heat-treated particulate absorbent polymers.

Comparative Example 11

Into a polyethylene container equipped with an agitator and a cooling coil 723 g aqueous 50 wt % NaOH solution and 1167 g of distilled water were added and cooled to 20° C. 310 g of glacial acrylic acid was then added to the caustic solution and the solution was again cooled to 20° C. 3.83 g of polyethylene glycol monoallylether acrylate, 2.23 g of polyethylene glycol 300 diacrylate, and 620 g of glacial acrylic acid were mixed and then added to the first solution followed by cooling to 4-6° C.

Nitrogen was bubbled through the monomer solution for 5 minutes. The cooling coil was removed from the container. Under agitation 4.56 g NaHCO$_3$ dissolved in 67 g distilled water was added followed by an addition of 30 g of a 1% by weight of H$_2$O$_2$ aqueous solution, 45 g of a 2 wt % aqueous sodium persulfate solution, and 27 g of a 0.5 wt % aqueous sodium erythorbate solution to initiate the polymerization reaction. The agitator was stopped after 30 s and the initiated monomer was polymerized for 25 minutes.

Example 12

The same as Comparative Example 11 except after the addition of the blowing agent, the monomer solution was ultrasonically treated with a Hielscher UIP500 at an amplitude of 100% while stirring with a magnetic stir plate. A 34 mm diameter ultrasonic probe was used and the tip submersed into the solution by 1 cm to 2 cm. The treatment was performed for 10 s.

The absorbent polymer gel obtained in Examples 11 and 12 was further processed as described below.

A particulate absorbent polymer was prepared as previously described in Comparative Example 6 and Example 7.

The product was sieved to arrive at the following particle size distribution based on U.S. standard test sieves: 15 wt % on mesh 100 (150 μm), 50 wt % on mesh 50 (300 μm), 30% on mesh 35 (500 μm) and 5% on mesh 30 (600 μm). CRC and vortex were determined of the uncoated particulate absorbent polymers.

200 g of each example sample were coated with aqueous ethylene carbonate solution, heated and sieved according to the process described in Examples 8, 9 and 10.

CRC, AUL, vortex and FSR were determined of the coated and heat-treated particulate absorbent polymers. These values are summarized in Table 5. It can be clearly seen that the addition of an ultrasonic treatment increases the absorption rate (lowers the Vortex time and increases the FSR value) while maintaining excellent absorption properties.

Table 6 summarizes the average pore diameter for different comparative examples and examples listed above. This table also illustrates the reduction in average pore diameter, as described herein, for monomer solutions with blowing agent that were treated with ultrasound versus those there were not. As can be seen, all monomer solutions with blowing agent that were also treated with ultrasound showed a dramatic decrease in the average pore diameter.

TABLE 5

| Example | blowing agent | Ultrasound Treatment | Time at 185° C. (min) after coating | Vortex (s) | CRC (g/g) | 0.9 AUL (g/g/s) | FSR (g/g) | Percent reduction in vortex by addition of ultrasound | Percent increase in FSR by addition of ultrasound |
|---|---|---|---|---|---|---|---|---|---|
| Comparative Ex 4-1 | NaHCO$_3$ | none | 0, uncoated | 55 | 42.9 | | | | |
| Comparative Ex 4-2 | | | 40 | 70.5 | 32.1 | 25.6 | | | |
| Ex 5-1 | NaHCO$_3$ | Yes | 0, uncoated | 47 | 41.7 | | | −15% | |
| Ex 5-2 | | | 40 | 62 | 31.9 | 25.9 | | −12% | |
| Comparative Ex 6-1 | NaHCO$_3$ | none | 0, uncoated | 62 | 50.7 | | | | |
| Comparative Ex 6-2 | | | 40 | 93 | 37 | 24 | 0.24 | | |
| Ex 7-1 | NaHCO$_3$ | Yes | 0, uncoated | 46 | 48.3 | | | −26% | |
| Ex 7-2 | | | 40 | 58 | 37.1 | 24.3 | 0.36 | −38% | 50% |
| Ex 8-1 | NaHCO$_3$ | Yes | 0, uncoated | 55.3 | 42.3 | | | | |
| Ex 8-2 | | | 50 | 69.7 | 30.9 | 22.8 | | | |
| Ex 9-1 | Na$_2$CO$_3$ | Yes | 0, uncoated | 44 | 43.1 | | | | |
| Ex 9-2 | | | 50 | 68.3 | 31 | 23.5 | | | |
| Ex 10-1 | Na$_2$CO$_3$ | Yes | 0, uncoated | 50.7 | 42 | | | | |
| Ex 10-2 | | | 50 | 63.3 | 31.5 | 24.8 | | | |
| Comparative Ex. 11-1 | Na$_2$CO$_3$ | none | 0, uncoated | 58 | 48.4 | 6.9 | 0.31 | | |
| Comparative Ex. 11-2 | | | 50 | 79.5 | 35.1 | 24.8 | 0.28 | | |
| Ex. 12-1 | Na$_2$CO$_3$ | Yes | 0, uncoated | 44 | 46 | 6.9 | 0.39 | −24% | |
| Ex. 12-2 | | | 50 | 50 | 31.9 | 25.8 | 0.41 | −37% | 46% |

TABLE 6

| Example | blowing agent | Ultrasound Treatment | Average pore diameter (μm) | Percent reduction in average pore diameter by addition of ultrasound |
|---|---|---|---|---|
| Comparative Ex 1-2 | NaHCO₃ | none | 370 | |
| Ex 1-3 | NaHCO₃ | Yes | 60 | −84% |
| Ex 2-2 | CO₂ | Yes | 110 | −79% |
| Comparative Ex 3-1 | none | none | 100 | |
| Comparative Ex 3-2 | NaHCO₃ | none | 220 | |
| Ex 3-3 | NaHCO₃ | Yes | 20 | −91% |
| Comparative Ex 4-1 | NaHCO₃ | none | 220 | |
| Ex 5-1 | NaHCO₃ | Yes | 80 | −64% |
| Comparative Ex 6-1 | NaHCO₃ | none | 530 | |
| Ex 7-1 | NaHCO₃ | Yes | 90 | −83% |
| Ex 8-1 | NaHCO₃ | Yes | 90 | −83% |
| Ex 9-1 | Na₂CO₃ | Yes | 80 | −85% |
| Ex 10-1 | Na₂CO₃ | Yes | 90 | −83% |
| Comparative Ex. 11-1 | NaHCO₃ | none | 290 | |
| Ex. 12-1 | NaHCO₃ | Yes | 100 | −211% |

Notwithstanding that the numerical ranges and parameters setting forth the broad scope of the invention are approximations, the numerical values set forth in the specific examples are reported as precisely as possible. Other than in the operating examples, or where otherwise indicated, all numbers expressing quantities of ingredients, reaction conditions, and so forth used in the specification and claims are to be understood as being modified in all instances by the term "about." Any numerical value, however, inherently contains certain errors necessarily resulting from the standard deviation found in their respective testing measurements.

What is claimed is:

1. A process for making a polymeric foam comprising the steps of a) providing a monomeric solution consisting of an acrylic acid, it salt or solutions thereof, water and one or more crosslinkers having more than one polymerizable group per molecule; b) introducing a blowing agent to the monomer solution; c) treating the monomer solution with an ultrasonic treatment in a duration of less than 1 minute, and adding the energy to be transmitted into the monomer solution between 0.01 and 3 kJ/kg monomer solution; d) introducing one or more initiation agents to the monomer solution; e) polymerizing the monomer solution; f) polymerizing the monomer solution into a polymeric foam sheet; and g) cutting or forming the polymeric foam sheet into a shoe sole insert shape, or comminuting the polymeric foam sheet into particles.

2. The process of claim 1 wherein the blowing agent is a carbonate or a bicarbonate based compound or carbon dioxide.

3. The process of claim 1 wherein treating the monomer solution with an ultrasonic treatment comprises introducing energy by an ultrasonic probe or an ultrasonic transducer driven surface.

4. The process of claim 1 wherein the blowing agent is further applied prior to gelation of the monomer solution during polymerization.

5. The process of claim 1 wherein ultrasonic radiation is further applied prior to gelation of the monomer solution during polymerization.

6. The process of claim 1 wherein the ultrasonic treatment produces one or more of the following changes in the polymeric foam when compared to the same process except without ultrasonic treatment: a) a 10% reduction in average pore diameter; b) a 10% reduction in Young's modulus; c) a 10% reduction in vortex time; and d) a 10% increase in the Free Swell Rate (FSR).

7. The process of claim 1 wherein the ultrasonic treatment is in a duration of less than 30 seconds.

\* \* \* \* \*